United States Patent
Kadono et al.

(10) Patent No.: US 9,846,317 B2
(45) Date of Patent: Dec. 19, 2017

(54) OPTICAL MODULATOR, IMAGING DEVICE AND DISPLAY APPARATUS INCLUDING A DIELECTRIC LAYER AND AN ELECTRODE COMPRISING GRAPHENE

(71) Applicant: Sony Corporation, Tokyo (JP)

(72) Inventors: Koji Kadono, Kanagawa (JP); Keisuke Shimizu, Kanagawa (JP); Nozomi Kimura, Kanagawa (JP); Masashi Bando, Kanagawa (JP); Kyoko Izuha, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/405,709

(22) PCT Filed: May 15, 2013

(86) PCT No.: PCT/JP2013/003102
§ 371 (c)(1),
(2) Date: Dec. 4, 2014

(87) PCT Pub. No.: WO2013/186985
PCT Pub. Date: Dec. 19, 2013

(65) Prior Publication Data
US 2015/0168747 A1 Jun. 18, 2015

(30) Foreign Application Priority Data
Jun. 14, 2012 (JP) .................... 2012-134456

(51) Int. Cl.
*H04N 5/225* (2006.01)
*G02F 1/01* (2006.01)
(Continued)

(52) U.S. Cl.
CPC ............. *G02F 1/0102* (2013.01); *G02B 1/08* (2013.01); *G02F 1/015* (2013.01);
(Continued)

(58) Field of Classification Search
CPC ........................................................ H04N 5/217
(Continued)

(56) References Cited

U.S. PATENT DOCUMENTS 4,793,697 A 12/1988 Wu et al.
2005/0122886 A1* 6/2005 Takahashi et al. ........... 369/126
(Continued)

FOREIGN PATENT DOCUMENTS

EP 2327662 6/2011
EP 2506304 10/2012
(Continued)

OTHER PUBLICATIONS

Subramanian Balaji et al, "Hexagonal Tungsten Oxide Based Electrochromic Devices: Spectroscopic Evidence for the Li Ion Occupancy of Four-Coordinated Square Windows", Chem. Mater. 2009, vol. 21, pp. 1381-1389. (9 pages).
(Continued)

*Primary Examiner* — Usman Khan
(74) *Attorney, Agent, or Firm* — K&L Gates LLP

(57) ABSTRACT

There is provided an optical modulator capable of electrically controlling intensity of transmitted light in a desired wavelength range at a high speed and reducing the size of a device containing the optical modulator. The optical modulator includes a first electrode; a second electrode; and a dielectric layer provided between the first and second electrodes. At least one of the first electrode and the second electrode comprises at least one layer of graphene. There are also provided an imaging device and a display apparatus each containing the optical modulator.

17 Claims, 23 Drawing Sheets

(51) Int. Cl.
  *G02F 1/015* (2006.01)
  *G02B 1/08* (2006.01)
  *G02F 1/1343* (2006.01)
  *G02F 1/155* (2006.01)
(52) U.S. Cl.
  CPC .......... *G02F 1/13439* (2013.01); *G02F 1/155* (2013.01); *G02F 2001/0156* (2013.01)
(58) Field of Classification Search
  USPC .......................................................... 348/340
  See application file for complete search history.

(56) References Cited

U.S. PATENT DOCUMENTS

| | | | |
|---|---|---|---|
| 2009/0058737 A1* | 3/2009 | Tsujimura et al. ............ | 343/702 |
| 2009/0146111 A1* | 6/2009 | Shin ........................ | B82Y 30/00 252/510 |
| 2010/0051960 A1* | 3/2010 | Chen .................... | H01L 29/1606 257/76 |
| 2011/0116168 A1* | 5/2011 | Nikoobakht ........... | B82Y 20/00 359/585 |
| 2011/0260136 A1* | 10/2011 | Lee et al. ............................ | 257/9 |
| 2012/0249829 A1* | 10/2012 | Izuha ................ | H01L 27/14621 348/229.1 |
| 2013/0015429 A1* | 1/2013 | Hong et al. ...................... | 257/29 |
| 2014/0321483 A1 | 10/2014 | Fermann et al. | |
| 2014/0347493 A1* | 11/2014 | Higashitsutsumi .. | H04N 5/2254 348/164 |

FOREIGN PATENT DOCUMENTS

| | | |
|---|---|---|
| JP | 06-165003 | 6/1994 |
| JP | 07-056147 | 3/1995 |
| JP | 08-160340 | 6/1996 |
| JP | 08-294059 | 11/1996 |
| JP | 2003-140149 | 5/2003 |
| JP | 2014-512312 | 8/2014 |
| WO | 2012/166572 | 12/2012 |

OTHER PUBLICATIONS

Chi-Fan Chen et al., "Controlling inelastic light scattering quantum pathways in graphene", Nature, vol. 471, Mar. 31, 2011, pp. 617-620. (4 pages).
Ming Liu et al., "A graphene-based broadband optical modulator", Nature, vol. 474, Jun. 2, 2011, pp. 64-67. (4 pages).
Ionela Vrejoiu et al., "Intrinsic Ferroelectric Properties of Strained Tetragonal PbZr0.2Ti0.8O3 Obtained on Layer-by-Layer Grown, Defect-Free Single-Crystalline Films," Adv. Mater., 2006, vol. 18, pp. 1657-1661. (5 pages).
Ming Liu et al: "Double-layer graphene optical modulator", Nano Letters, American Chemical Society, US, vol. 12, No. 3, Mar. 14, 2012, pp. 1482-1485. (4 pages).
Strikha M V et al: "Carrier-induced modulation of radiation by a gated graphene", Journal of Applied Physics, American Institute of Physics, New York, US, vol. 110, No. 8, Oct. 15, 2011, pp. 83106-83106. (5 pages).
M Strikha: "Modulation of mid-IR radiation by a gated graphene on ferroelectric substrate", Ukrainian Journal of Physical Optics, vol. 12, No. 4, Jan. 1, 2011, p. 161. (8 pages).
Japanese Office Action dated Oct. 4, 2016 in corresponding Japanese Application No. 2012-134456.
Japanese Office Action dated Mar. 8, 2016 in corresponding Japanese Application No. 2012134456.
Optics Express, Feb. 27, 2012, vol. 20, No. 5, pp. 5264-5269.

* cited by examiner

TRANSMITTED LIGHT

TRANSMITTED LIGHT

TRANSMITTED LIGHT

OPTICAL MODULATOR, IMAGING DEVICE AND DISPLAY APPARATUS INCLUDING A DIELECTRIC LAYER AND AN ELECTRODE COMPRISING GRAPHENE

CROSS REFERENCES TO RELATED APPLICATIONS

The present application is a national stage of International Application No. PCT/JP2013/003102 filed on May 15, 2013 and claims priority to Japanese Patent Application No. 2012-134456 filed on Jun. 14, 2012, the disclosure of which is incorporated herein by reference.

BACKGROUND

The present disclosure relates to an optical modulator, an imaging device and a display apparatus, and in particular, an optical modulator using graphene, an imaging device and a display apparatus using the optical modulator.

It is necessary for an imaging device to control an incident light intensity to a predetermined light intensity to enlarge a dynamic range. Moreover, it is necessary for a display apparatus such as a liquid crystal display or an organic electroluminescence display (organic EL display) to control light intensity used in displaying to a predetermined value to express a gradation. In addition, when such light intensity control is performed, it is necessary to change the light intensity at a predetermined speed.

In the related art, as a method of electrically controlling light intensity, for example, there are a method of controlling an orientation of liquid crystal molecules and a method of using an electrochromic material (tungsten oxide, viologen and the like) in which a reversible change in a molecule structure is used (for example, refer to PTL 1, PTL 2 and NPL 1).

However, since response speed is not sufficiently fast due to the orientation operation of liquid crystal molecules, and there is a large amount of loss in transmitted light intensity by the liquid crystal molecules, the method of controlling an orientation of liquid crystal molecules does not have a sufficient transmittance in a transparent mode. Moreover, there is a problem that an orientation portion and an electrode portion are enlarged in a liquid crystal unit. In addition, the response speed achieved by the method using an electrochromic material, the response time is in the order of millisecond, is low in comparison with that achieved by the method using the orientation of liquid crystal molecules, and there is a limitation in a wavelength range in which light intensity can be adjusted. Additionally, since it is difficult to reduce a light intensity control mechanism in size by using these methods, for example, light intensity control for each pixel of a solid state imaging device is difficult.

On the other hand, graphene has been paid significant attention to in recent years. Graphene, which has a thickness of the order of a monoatomic layer only made of carbon atoms, is a two-dimensional material, and is a zero-gap semiconductor which is different from general semiconductors in that it has a linear band structure. Dopants are absorbed into the surface of the graphene, that is, chemical doping is performed to induce carriers so that the Fermi level of the graphene can be shifted. When the energy of an amount of the shift in the Fermi level is set to delta $E_F$, the light absorption of the energy of equal to or less than 2|delta $E_F$| is prohibited from the unique band structure.

In the related art, as a device which electrically controls the absorptance of graphene, there is a report of the following device (refer to NPL 2). In the device, graphene is formed on a $SiO_2$ film, a source electrode is formed at one end of the graphene, and a drain electrode is formed at the other end. Then, the $SiO_2$ film, the source electrode and the drain electrode are covered by ion gel, and a gate electrode is formed thereon. The source electrode is grounded and a gate voltage is applied to the gate electrode so that an electric field is applied to the graphene through the ion gel to control the absorptance.

In addition, as a device which electrically controls the absorptance of graphene, there is also a report of a graphene-based waveguide-integrated optical modulator for terahertz optical communication (refer to NPL 3). The graphene-based waveguide-integrated optical modulator has a structure in which graphene is formed on a silicon waveguide with aluminum oxide ($Al_2O_3$) interposed therebetween, and controls a degree in which light which is transmitted through the silicon waveguide is absorbed and attenuated by the graphene through application of external voltage. In the graphene-based waveguide-integrated optical modulator, the Fermi level of the graphene is shifted by the voltage application to control the light absorptance of an infrared region.

CITATION LIST

Patent Literature

PTL 1: Japanese Unexamined Patent Application Publication No. 6-165003
PTL 2: Japanese Unexamined Patent Application Publication No. 8-160340

Non Patent Literature

NPL 1: Chem. Mater., 2009, 21 (7), pp. 1381-1389
NPL 2: Nature 471, 617 (2011)
NPL 3: LETTER (2011) doi: 10.1038/nature10067
NPL 4: Adv. Mater. 18, 1657 (2006)

SUMMARY

Technical Problem

However, when a high voltage is applied through the ion gel in the device reported in NPL 2, decomposition of the ion gel proceeds. For this reason, for example, carriers of equal to or more than 33 microcoulombs/$cm^2$ which is necessary for light intensity control of the entire visible light region might not be accumulated in the graphene. In addition, it is difficult to reduce the size of the device.

In addition, the graphene-based waveguide-integrated optical modulator reported in NPL 3 merely attenuates the light in a terahertz region which is propagated through the silicon waveguide using peripheral graphene and does not have a function of controlling the intensity of incident light from the outside since silicon is used for a substrate.

It is desirable to provide a transmitted light intensity control device, that is, an optical modulator which is capable of electrically controlling intensity of transmitted light in a desired wavelength range at a high speed and reducing the size of the device.

It is also desirable to provide an excellent imaging device and display apparatus using the optical modulator.

Solution to Problem

According to an embodiment of the present disclosure, there is provided an optical modulator including a junction formed by at least one layer of graphene which forms an electrode and a transmittance modulation layer and a dielectric layer, wherein an amount of charge accumulated in the graphene is controlled by applying voltage to the junction to control transmitted light intensity.

According to another embodiment of the present disclosure, there is provided an imaging device in which a light receiving unit includes an optical modulator which has a junction formed by at least one layer of graphene which forms an electrode and a transmittance modulation layer and a dielectric layer, and in which an amount of charge accumulated in the graphene is controlled by applying voltage to the junction to control transmitted light intensity.

In the imaging device, the light intensity of the light incident to the light receiving unit is controlled by the optical modulator. The imaging device includes a CMOS image sensor, a CCD image sensor and the like.

According to still another embodiment of the present disclosure, there is provided a display apparatus in which a light emitting unit includes an optical modulator which has a junction formed by at least one layer of graphene which forms an electrode and a transmittance modulation layer and a dielectric layer and in which an amount of charge accumulated in the graphene is controlled by applying voltage to the junction to control transmitted light intensity.

In the display apparatus, the light intensity of the light emitted from the light emitting unit to perform displaying is controlled by the optical modulator. For example, the display apparatus includes a liquid crystal display, an organic EL display, and the like.

In the optical modulator, when voltage is applied to the junction formed by at least one layer of the graphene which forms the electrode and the transmittance modulation layer and the dielectric layer, a positive or negative charge is induced in the surface of the dielectric layer facing the graphene depending on a polarity of the voltage and thereby, the negative or positive charge is accumulated in the graphene. Then, a wavelength region of the light capable of transmittance modulation by the graphene is determined according to the accumulated amount of charge, and as the accumulated charge amount is increased, the transmittance modulation of the light in a wavelength region which has a shorter wavelength, that is, optical modulation can be performed. While the wavelength region of the light which performs optical modulation can be appropriately selected according to properties necessary for the optical modulator or the like, for example, the optical modulation of a wavelength region of equal to or more than 8 micrometers, equal to or more than 1.4 micrometers, or equal to or more than 380 nm can be performed. For example, when a charge of equal to or more than 1 microcoulomb/$cm^2$ is accumulated in the one layer of the graphene, the optical modulation of a wavelength region of equal to or more than 2.2 micrometers can be performed, and when a charge of equal to or more than 33 microcoulombs/$cm^2$ is accumulated, the optical modulation of the entire visible light region can be performed.

In the optical modulator, at least one layer of the graphene which forms the electrode and the transmittance modulation layer may be provided on one surface of the dielectric layer and may be provided on both surfaces of the dielectric layer. When at least one layer of the graphene which forms the electrode and the transmittance modulation layer is provided on only one surface of the dielectric layer, an electrode which does not form the transmittance modulation layer is provided on the other side of the dielectric layer.

At least one layer of the graphene may be one layer of graphene or laminated graphene in which a plurality of layers of graphene are laminated. Since a transmittance modulation width per layer of graphene is about 2%, the laminated graphene is used to increase the transmittance modulation width (or optical modulation quantity).

Chemical doping can be performed on at least one layer of the graphene, as necessary, and thereby, the Fermi level of the graphene can be controlled to generate carriers in the graphene. In this manner, carrier density which is necessary for accumulation in the graphene to perform transmittance modulation in the wavelength region of the light to perform optical modulation can be easily obtained, or the voltage which is necessary for application to perform optical modulation can be decreased by the carriers induced by voltage application and the homopolarity carriers introduced due to the chemical doping. For example, when a charge of equal to or more than 1 microcoulomb/$cm^2$ is accumulated in the graphene by the chemical doping, optical modulation in a wavelength region equal to or less than 1 micrometer can be performed by voltage application. In order to perform the chemical doping, specifically, a dopant layer is formed on the graphene. The dopant layer may be an electron acceptance type (p-type) dopant layer or may be an electron donation type (n-type) dopant layer. Since electrons, which are carriers each having a negative charge, are introduced into the graphene forming the electron donation type dopant layer, when the electrons are generated in the graphene by applying the voltage in which the graphene side is a negative potential side, the carrier density of the graphene, that is, the accumulated charge amount is increased so that a wavelength region of the light capable of performing optical modulation can be increased in comparison with the case in which chemical doping is not performed. In addition, since holes which are carriers each having a positive charge, are introduced into the graphene forming the electron acceptance type dopant layer, when the holes are generated by applying the voltage in which the graphene side is a positive potential side, the carrier density of the graphene, that is, the accumulated charge amount is increased so that a wavelength region of the light capable of performing optical modulation can be increased in comparison with the case in which chemical doping is not performed. When the voltage in which the graphene side is a positive potential side is applied to the graphene forming the electron donation type dopant layer, holes are generated in the graphene and the carrier density, that is, the accumulated charge amount is decreased so that transmittance is decreased at the time of voltage application.

While the dielectric substance forming the dielectric layer is selected as necessary, suitably, a dielectric substance having a large relative permittivity (paraelectric substance or high dielectric substance), for example, a dielectric substance having a relative permittivity of equal to or more than 2.0, more suitably, a dielectric substance having a relative permittivity of equal to or more than 4.0, further suitably, a paraelectric substance having a relative permittivity of equal to or more than 8.0 are used in order to increase the amount of charge accumulated in the graphene by voltage application. As the dielectric substance forming the dielectric layer, a ferroelectric substance having spontaneous polarization can be used. When a ferroelectric substance is used as the dielectric substance forming the dielectric layer, the polarization of the ferroelectric substance is reversed by applying positive and negative voltages to the junction, and for example, by accumulating a charge of 8 microcoulombs/$cm^2$, the optical modulation of the light having a wavelength of the visible light region can be performed. While the dielectric layer is typically solid, a liquid crystal layer which is made of liquid crystal molecules, particularly, liquid crystal molecules having a high relative permittivity may be used, and suitably, a liquid crystal layer which is made of liquid crystal molecules in which transmittance is improved at the time of voltage application is used. When a liquid crystal layer is used as the dielectric layer, the optical modulator is a liquid crystal filter, and graphene can be used as a driving electrode of the liquid crystal filter. In such a crystal liquid filter, optical modulation can be performed by the liquid layer and the graphene. As the dielectric substance forming the dielectric layer, an ion liquid or a solid electrolyte can be used.

The entire thickness of the dielectric layer and the electrodes provided on both surfaces may be controlled as necessary so that the light having a wavelength to perform optical modulation is reflected inside thereof in a multiple manner. By doing this, for example, a transmittance modulation width per layer of graphene can be increased to equal to or more than 2.3%.

Metal nanoparticles or metal nanowires are formed on the graphene as necessary and a transmittance modulation width per layer of graphene can be increased, for example, to equal to or more than 2.3% using surface plasmon polaritons thereof.

The wavelength dependence of optical modulation quantity generated to improve optical modulation quantity can be released by laminating an optical adjustment layer, as necessary.

It is possible to increase the transmittance modulation width by arranging the plurality of the optical modulators in a light incident direction, as necessary.

According to one embodiment, the present disclosure provides an optical modulator comprising: a first electrode; a second electrode; and a dielectric layer provided between the first and second electrodes. At least one of the first electrode and the second electrode comprises at least one layer of graphene.

According to an embodiment, the present disclosure provides an imaging device comprising a light receiving unit. The light receiving unit includes an optical modulator for controlling an intensity of light incident to the light receiving unit. The optical modulator comprises: a first electrode; a second electrode; and a dielectric layer provided between the first and second electrodes. At least one of the first electrode and the second electrode comprises at least one layer of graphene.

According to an embodiment, the present disclosure provides A display apparatus comprising a light emitting unit. The light emitting unit includes an optical modulator for controlling an intensity of light emitted from the light emitting unit to perform displaying. The optical modulator comprises: a first electrode; a second electrode; and a dielectric layer provided between the first and second electrodes. At least one of the first electrode and the second electrode comprises at least one layer of graphene.

Advantageous Effects of Invention

According to the embodiments of the present disclosure, it is possible to electrically control transmitted light intensity of the light of a desired wavelength range at a high speed and to obtain an optical modulator of reduced size. Then, for example, the excellent optical modulator is used in the light receiving unit in the imaging device so that a dynamic range can be easily extended and an excellent imaging device can be realized. In addition, the excellent optical modulator is used in the light emitting unit in the display apparatus so that gradation can be easily expressed and an excellent display apparatus can be realized.

Additional features and advantages are described herein, and will be apparent from the following Detailed Description and the figures.

DETAILED DESCRIPTION

Hereinafter, Embodiments of the present disclosure (hereafter, referred to as "embodiments") will be described. The description will be made in the following order.
1. First Embodiment (Optical Modulator, Method of Manufacturing Optical Modulator and Method of Operating Optical Modulator)
2. Second Embodiment (Optical Modulator, Method of Manufacturing Optical Modulator and Method of Operating Optical Modulator)
3. Third Embodiment (Optical Modulator, Method of Manufacturing Optical Modulator and Method of Operating Optical Modulator)
4. Fourth Embodiment (Optical Modulator, Method of Manufacturing Optical Modulator and Method of Operating Optical Modulator)
5. Fifth Embodiment (Optical Modulator, Method of Manufacturing Optical Modulator and Method of Operating Optical Modulator)
6. Sixth Embodiment (Optical Modulator, Method of Manufacturing Optical Modulator and Method of Operating Optical Modulator)
7. Seventh Embodiment (Optical Modulator, Method of Manufacturing Optical Modulator and Method of Operating Optical Modulator)
8. Eighth Embodiment (Image Sensor Module, Method of Manufacturing Image Sensor Module and Method of Operating Image Sensor Module)
9. Ninth Embodiment (Solid State Imaging Device and method of Operating the Same)
10. Tenth Embodiment (Solid State Imaging Device and Method of Operating the Same)

1. First Embodiment

Optical Modulator

Figure 1:
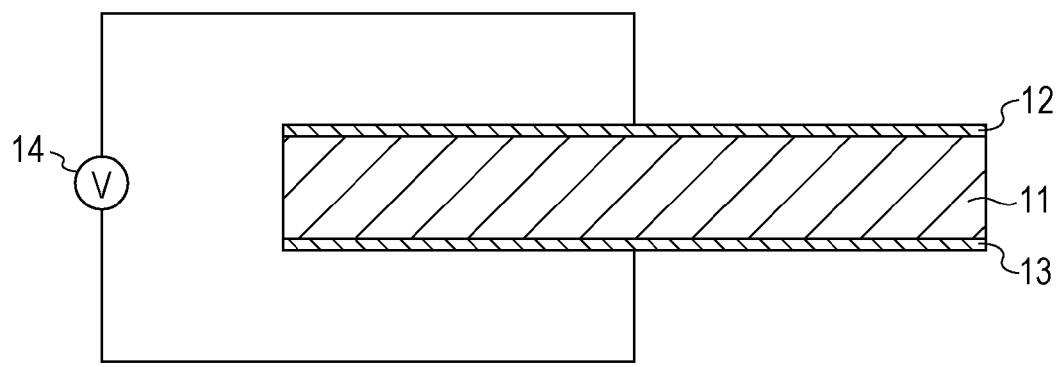
FIG. 1 is a schematic diagram showing an optical modulator according to a first embodiment.

FIG. 1 shows an optical modulator according to a first embodimenent. As shown in FIG. 1, the optical modulator includes a dielectric layer 11, and electrodes 12 and 13 which are provided on both surface (a top surface and a bottom surface) of the dielectric layer 11. Junction is respectively formed by the dielectric layer 11 and the electrodes 12 and 13.

The electrodes 12 and 13 are made of a material transparent to light in a wavelength region which performs optical modulation, and one of the electrodes is or both electrodes are formed with one layer of graphene or laminated graphene which is formed with plural layers of graphene. One of the electrodes 12 and 13 which is formed with one layer of graphene or plural layers of graphene configures a transmittance modulation layer. Carrier doping is performed on one of the electrodes 12 and 13 which is formed with one layer of graphene or plural layers of graphene by performing chemical doping as necessary. For example, the other of the electrodes 12 and 13 which does not contain graphene can be formed by one kind or a combination of two or more kinds of transparent conductive metal oxides such as tin-doped indium oxide (ITO), zinc-doped indium oxide (IZO), indium gallium-doped zinc oxide (IGZO), aluminum-doped zinc oxide (AZO) and titanium dioxide ($TiO_2$). The electrodes 12 and 13 are provided on a substrate which is made of a material transparent to light in a wavelength region which performs optical modulation as necessary.

The dielectric layer 11 is configured by a dielectric substance transparent to light in a wavelength region which performs optical modulation. There is no particular limitation to the dielectric substance configuring the dielectric layer 11, the dielectric substance can be selected as necessary, and may be a paraelectric substance or a ferroelectric substance. As the dielectric substance configuring the dielectric layer 11, suitably, a dielectric substance in which the charge density of polarization charge which can be induced on both surfaces of the dielectric layer 11 by applying voltage between the electrodes 12 and 13, without causing insulation breakdown, is high can be used. Examples of inorganic dielectric substances (paraelectric substance, high dielectric substance and ferroelectric substance) will be shown below.

TABLE 1

| Dielectric Substance | Relative Permittivity | Dielectric Strength Voltage (MV/cm) | Charge Density ($\mu C/cm^2$) |
| --- | --- | --- | --- |
| $SiO_2$ | 4 | 10 | 3.5 |
| $Al_2O_3$ | 8.2 | 8.2 | 6.0 |
| h-BN | 4 | 20 | 7.1 |
| $HfO_2$ | 18.5 | 7.4 | 12.0 |
| $ZrO_2$ | 29 | 6 | 15.4 |
| ZnO | 7.9 | | |
| $TiO_2$ | 8.5 | | |
| IGZO | 10 | | |
| SiN | 7 | 40 | 2.5 |
| GaN | 9.5 | | |
| STO | 140 | 2 | 24.8 |
| STO | 200 | 2 | 35.4 |
| BTO | 200 | 0.4 | 7.1 |
| PZT | 700 | 0.5 | 30.0 |
| PTO | 100-200 | 0.675 | 6.1-11.9 |

TABLE 1-continued

| Dielectric Substance | Relative Permittivity | Dielectric Strength Voltage (MV/cm) | Charge Density ($\mu C/cm^2$) |
|---|---|---|---|
| PLZT | 900 | 1.4 | 111 |
| $CaF_2$ | 6.6 | 0.3 | 1.1 |

Here, h-BN represents hexagonal boron nitride, STO represents strontium titanate, BTO represents barium titanate, PZT represents lead zirconate titanate, PTO represents lead titanate, and PLZT represents lead lanthanum zirconate titanate. While inorganic oxides generally have high dielectric properties and insulation properties, transparency is low in a far-infrared region. When optical modulation is performed in the far-infrared region, for example, $CaF_2$ which has high transparency in the far-infrared region can be used as the dielectric substance configuring the dielectric layer 11.

As the dielectric substance configuring the dielectric layer 11, polyvinylidene fluoride (PVDF) (relative permittivity of about 10), organic substances such as an amorphous fluororesin, ionic liquids, liquid crystals and the like may be used. While an organic insulation film is inferior in film durability, there are advantages in a process which is capable of application formation and has minor damage to a base substrate. As the crystal liquid, suitably, a normally black material in which diffused reflection is suppressed at the time of the voltage application to improve transparency is used. By using the normally black liquid crystal as the dielectric substance configuring the dielectric layer 11, the transmittance of graphene configuring the electrode and the transmittance modulation layer is improved at the time of the voltage application and a synergistic effect of optical modulation can be obtained.

Figure 2:
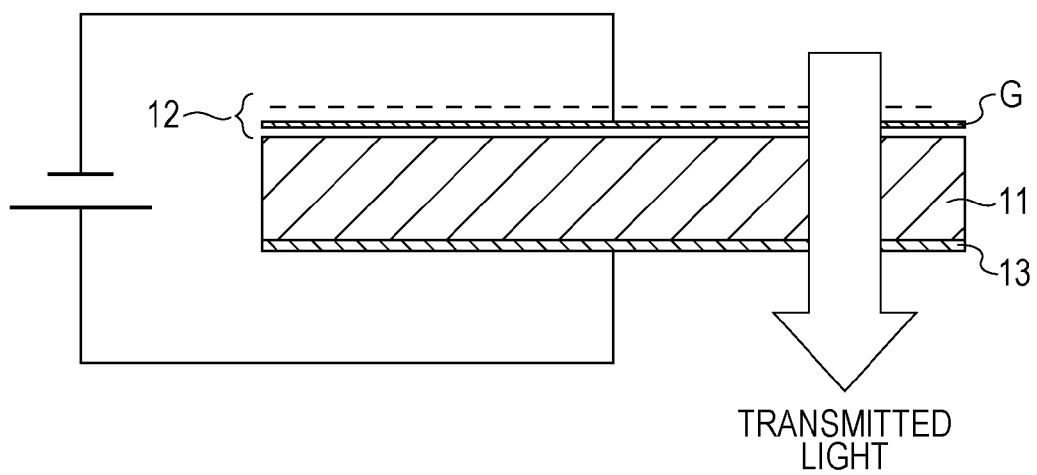
FIG. 2 is a schematic diagram showing a first configuration example of the optical modulator according to the first embodiment.

FIG. 2 shows the optical modulator in which the electrode 12 is formed with one layer of graphene G and the electrode 13 does not contain graphene. Since a transmittance modulation width a per layer of graphene G is about 2%, a transmittance modulation width delta T of the optical modulator is about 2%.

Figure 3:
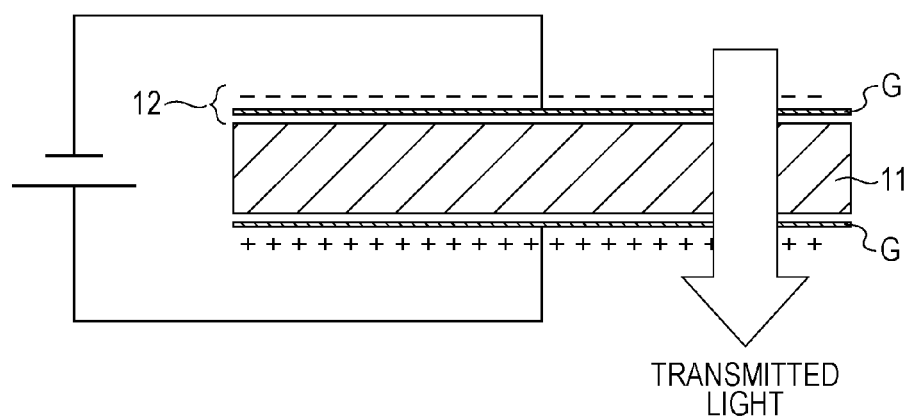
FIG. 3 is a schematic diagram showing a second configuration example of the optical modulator according to the first embodiment.

FIG. 3 shows the optical modulator in which both electrodes 12 and 13 are formed with one layer of graphene G. The transmittance modulation width delta T of the optical modulator is about a*2=4%.

Figure 4:
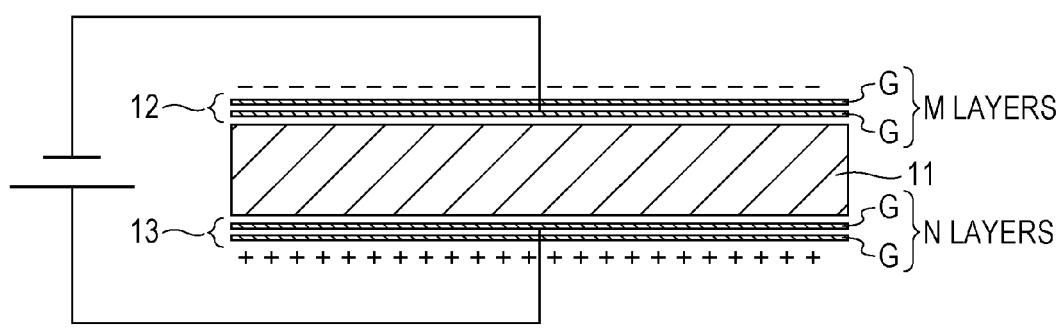
FIG. 4 is a schematic diagram showing a third configuration example of the optical modulator according to the first embodiment.

More generally, FIG. 4 shows the optical modulator in which the electrode 12 is formed with M (M is an integer which is equal to or more than 1) layers of graphene G, and the electrode 13 is formed with N (N is an integer which is equal to or more than 1, and N is equal to M or N is not equal to M) layers of graphene G. Since the optical modulator has a total of (M+N) layers of graphene G, the transmittance modulation width is delta T=a*(M+N).

When the absolute value of the amount of charge accumulated in the electrodes 12 and 13 is set as Q, the voltage applied between the electrodes 12 and 13 is set as V, and the capacitance per unit area of a capacitor having a structure in which the dielectric layer 11 is interposed between the electrodes 12 and 13 is set as C, equations of

Q=CV

C=epsilon/d (however, d is a distance between the electrodes 12 and 13, that is, a thickness of the dielectric layer 11, and epsilon is the permittivity of the dielectric substance configuring the dielectric layer 11), and Q=ne (however, e is the absolute value of electron charge, and n is the number of electrons) are satisfied.

When the Fermi level of the graphene is set as $E_F$, an equation of $E_F=(n/7.77*10^{13})^{0.5}$ is satisfied.

In addition, $E_{th}=2E_F$, and $lambda_{th}=hc/E_{th}$ $(=1240/E_{th})$. However, while $lambda_{th}$ is a threshold wavelength, and the transmittance of light having a wavelength which is shorter than $lambda_{th}$ is not modulated, the transmittance of light having a wavelength of equal to or more than $lambda_{th}$ can be modulated.

Figure 5:
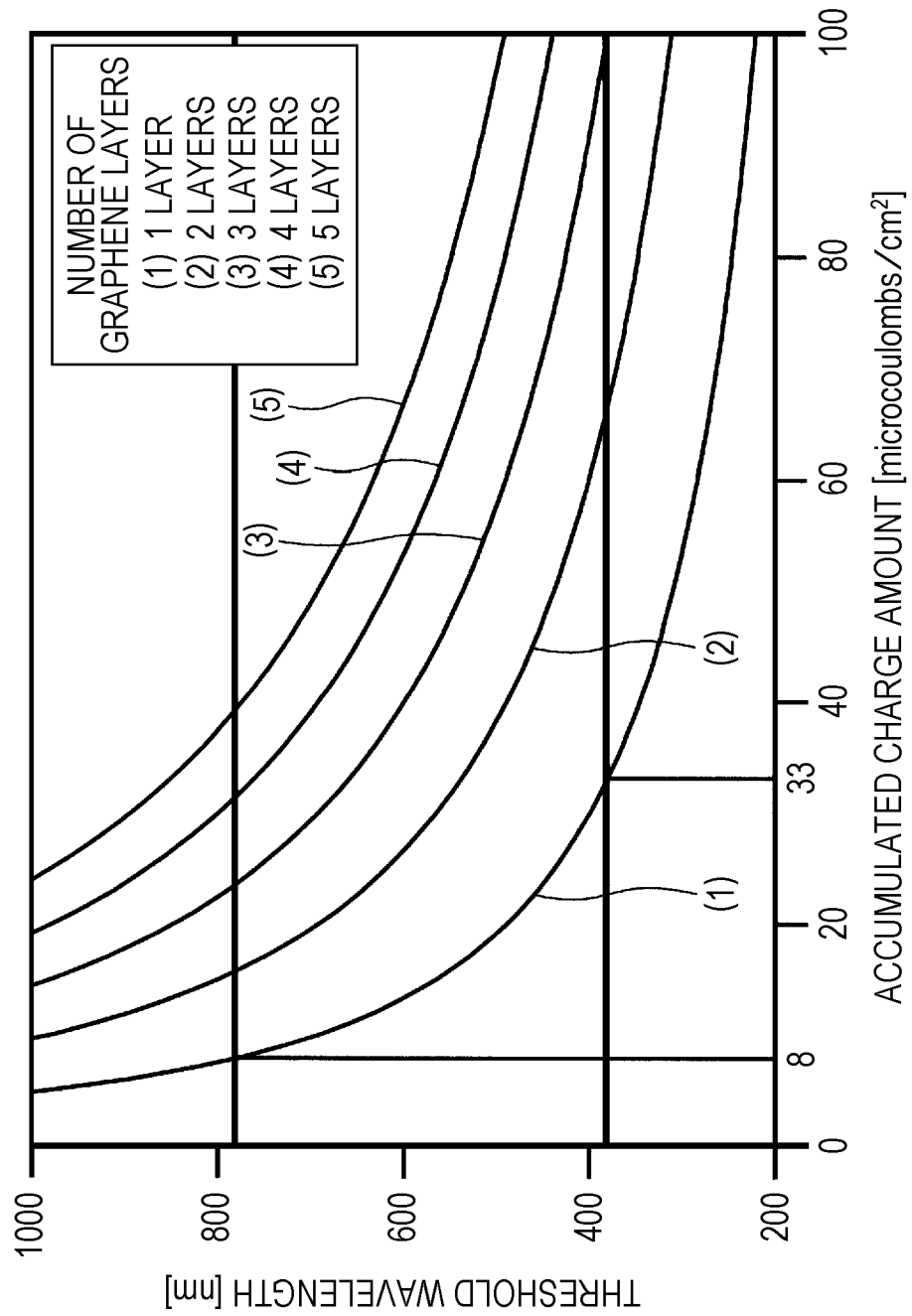
FIG. 5 is a schematic diagram showing a relationship between an accumulated charge amount and a threshold wavelength of graphene configuring an electrode in the optical modulator according to the first embodiment.

FIG. 5 shows a relationship between an accumulated charge amount in the graphene and threshold wavelength $lambda_{th}$ by changing the number of graphene layers in a range of 1 to 5. As seen from FIG. 5, when the graphene is one layer, and the accumulated charge amount is equal to or more than 8 microcoulombs/$cm^2$, the light having a wavelength of equal to or more than 780 nm, that is, the transmittance of infrared light can be controlled, and when the accumulated charge amount is equal to or more than 33 microcoulombs/$cm^2$, the light having a wavelength of equal to or more than 380 nm, that is, the transmittance of visible light or infrared light can be controlled. In addition, as the number of graphene layer is increased, the threshold wavelength $lambda_{th}$ is elongated with respect to the same accumulated charge amount.

The transmittance modulation conditions in the entire visible light region are as follows:

$lambda_{th}<380nm(delta\ n>2.1*10^{14}/cm^2)$; and delta $Q>33microcoulombs/cm^2$ (per layer of graphene on one side).

The transmittance modulation conditions in the entire infrared light region (visible light is transmitted all the time) are as follows:

$lambda_{th}\sim780nm(delta\ n\sim5.0*10^{13}/cm^2)$; and delta$Q>8microcoulombs/cm^2$ (per layer of graphene on one side).

Figure 6:
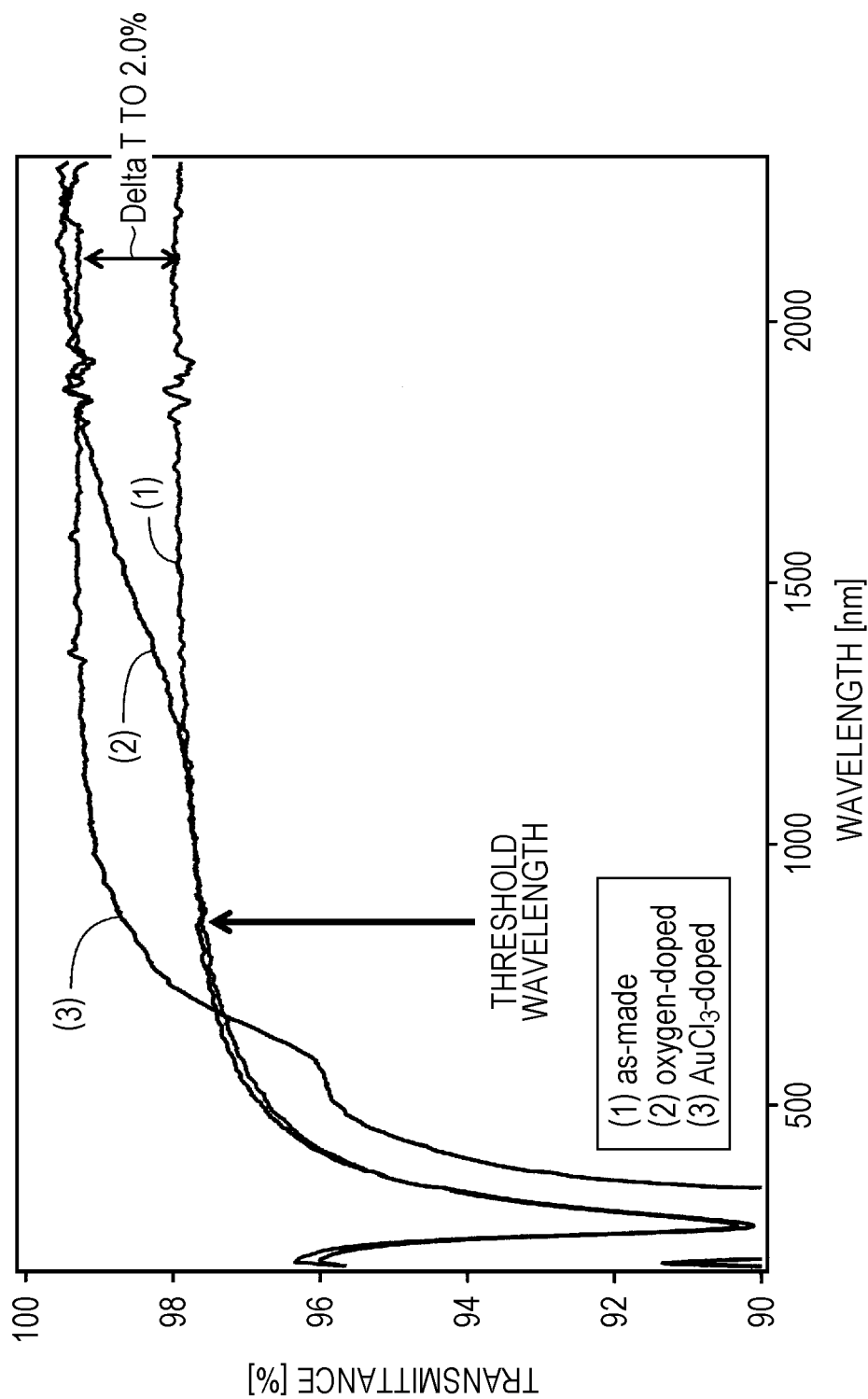
FIG. 6 is a schematic diagram showing measurement results of transmission spectrums of as-made graphene and graphene on which chemical doping has been performed.

It is possible to perform chemical doping on the graphene configuring the electrodes 12 and 13 as necessary. An example of the transmittance modulation of the graphene by the chemical doping will be described. FIG. 6 shows transmission spectrums of as-made graphene, oxygen-doped graphene, and $AuCl_3$-doped graphene. As shown in FIG. 6, the transmittance of the oxygen-doped graphene is large in a wavelength region of the threshold wavelength $lambda_{th}$ of about equal to or more than 830 nm, in comparison with the transmittance of the as-made graphene in the example, and delta T is about 2.0% in a wavelength region of the threshold wavelength of about equal to or more than 1800 nm. In addition, the transmittance of the $AuCl_3$-doped graphene is large in a wavelength region of the threshold wavelength $lambda_{th}$ of about equal to or more than 700 nm, in comparison with the transmittance of the as-made graphene, and delta T is about 2.0% in a wavelength region of the threshold wavelength of about equal to or more than 1000 nm.

Figure 7:
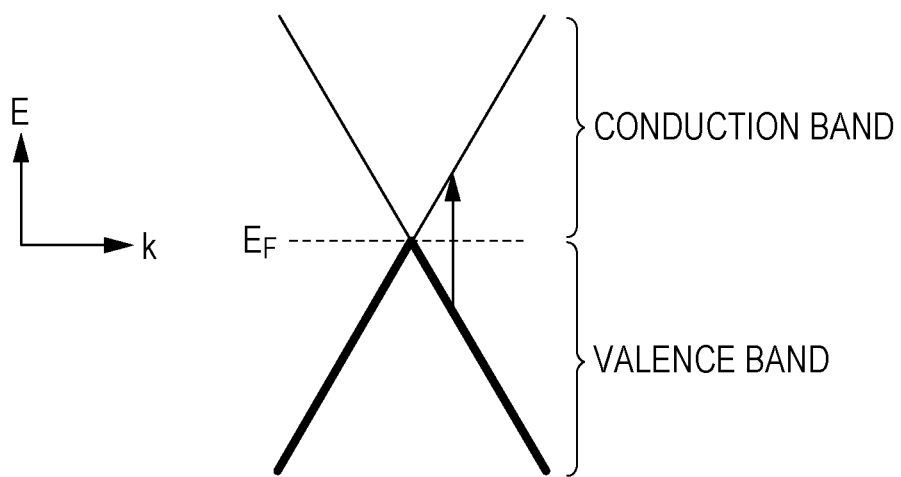
FIG. 7 is a schematic diagram showing a band structure of intrinsic graphene.
Figure 8:
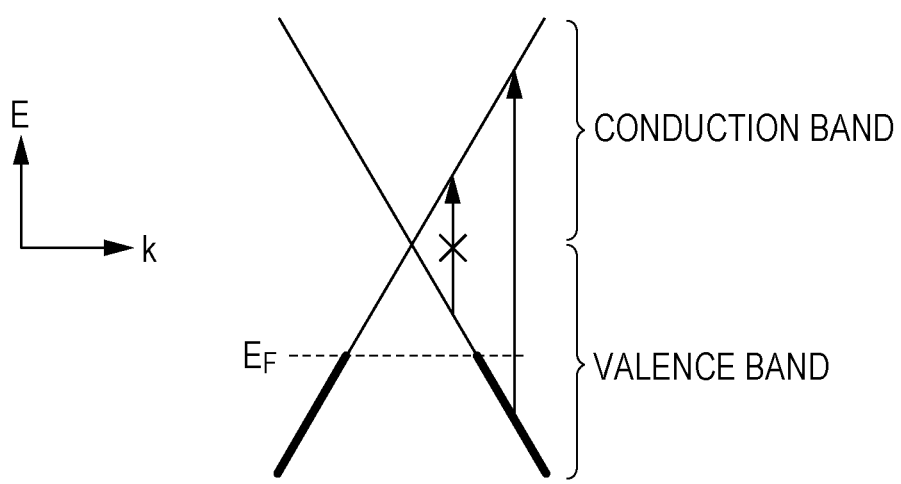
FIG. 8 is a schematic diagram showing a band structure of graphene on which hole doping has been performed.

The change in a band structure of graphene by chemical doping will be described. As shown in FIG. 7, electron transition from a valence band to a conduction band with respect to any of wave numbers k is possible in the band structure (E-k curve) of intrinsic graphene. Contrarily, as shown in FIG. 8, since the Fermi level $E_F$ is lowered in a band structure of hole-doped graphene, electron transition from a valence band to a conduction band with respect to wave numbers k in a predetermined range is prohibited.

Figure 9:
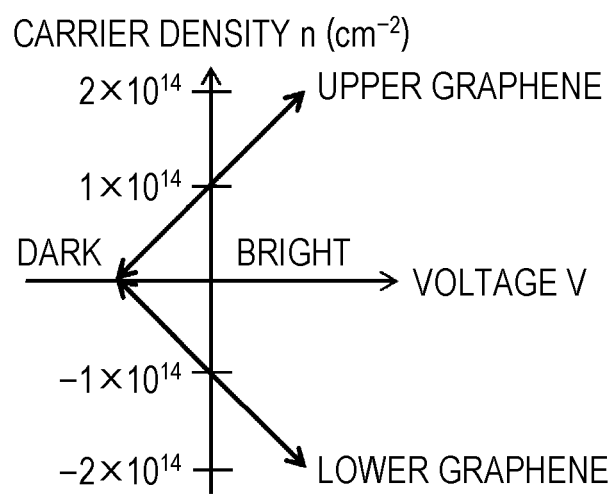
FIG. 9 is a schematic diagram showing a relationship between voltage V applied to the optical modulator and carrier density n accumulated in the graphene in the case where chemical doping of a concentration of $1*10^{14}/cm^2$ has been performed on the graphene configuring the electrode in the optical modulator according to the first embodiment.

FIG. 9 shows a relationship between carrier density n and voltage V of graphene. Since it is possible to perform carrier doping by performing chemical doping on the graphene, and by doing this, charge can be accumulated, an amount of charge which is necessary to be electrically changed to perform optical modulation can be decreased. For example, as shown in FIG. 3, when both electrodes 12 and 13 are formed with one layer of graphene, and chemical doping of $1*10^{14}/cm^2$ is performed on the graphene configuring the electrode 12, the carrier density can be modulated in a range of 0 to $2*10^{14}/cm^2$ by controlling the voltage V, and when chemical doping of $1*10^{14}/cm^2$ per layer is performed on the graphene configuring the electrode 13, the carrier density can be modulated in a range of 0 to $-2*10^{14}/cm^2$ (a negative sign means that the carriers which perform doping on the above graphene and the carriers of reversed polarity are doped) by controlling the voltage V. In FIG. 9, the graphene G configuring the electrode 12 on the upper side of FIG. 3 is referred to as upper graphene, and the graphene G configuring the electrode 13 on the lower side is referred to as lower graphene (the same hereinafter). The transmittance modulation conditions in the entire visible light region in this case are as follows:

delta $n>1.0*10^{14}/cm^2$; and delta $Q>16.5$ microcoulombs/$cm^2$ (per layer of graphene on one side).

Figure 10:
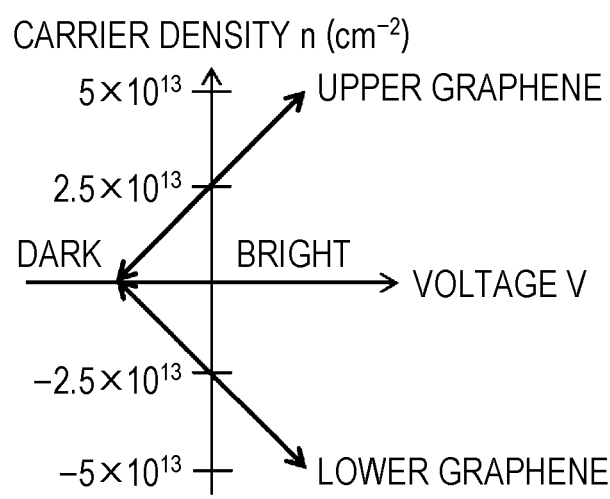
FIG. 10 is a schematic diagram showing a relationship between voltage V applied to the optical modulator and carrier density n accumulated in the graphene in the case where chemical doping of a concentration of $2.5*10^{13}/cm^2$ has been performed on the graphene configuring the electrode in the optical modulator according to the first embodiment.

In addition, as shown in FIG. 10, when carrier doping of $2.5*10^{13}/cm^2$ is performed on the upper graphene by chemical doping, the carrier density n can be modulated in a range of 0 to $5*10^{13}/cm^2$ by controlling the voltage V, and when carrier doping of $-2.5*10^{13}/cm^2$ is performed the lower graphene by chemical doping, the carrier density n can be modulated in a range of 0 to $2.5*10^{13}/cm^2$ by controlling the voltage V. When the transmittance modulation of the graphene film is performed in this case, the transmittance modulation conditions of the entire visible light region in the case where chemical doping is performed are as follows:

delta $n\sim2.5*10^{13}/cm^2$; and delta $Q\sim4$ microcoulombs/$cm^2$ (per layer of graphene on one side).

Figure 11:
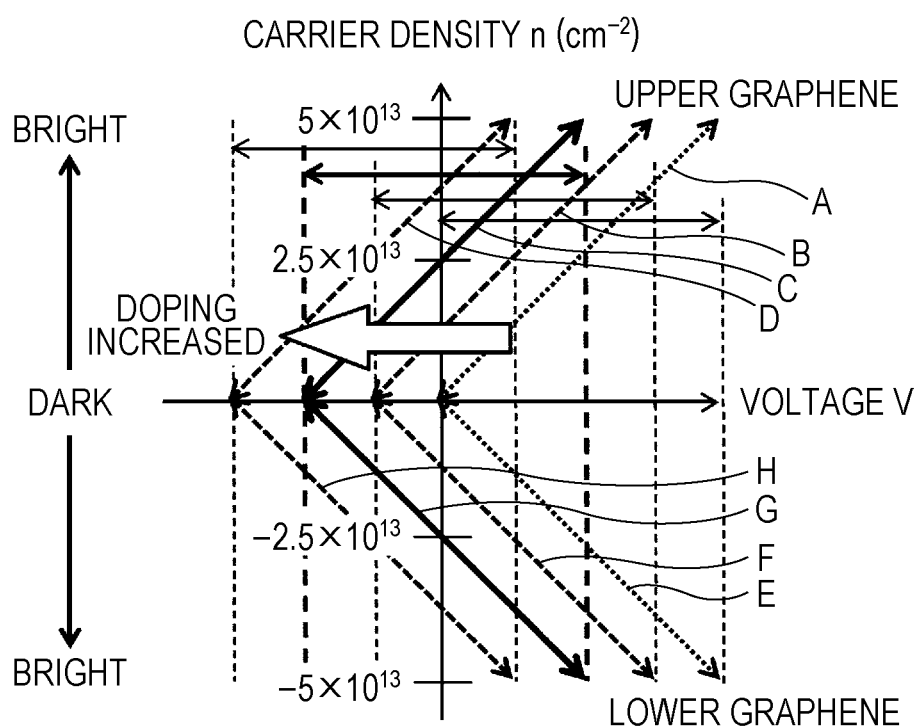
FIG. 11 is a schematic diagram showing a relationship between a doping amount and an accumulated charge variation delta Q.

Here, a relationship between a doping amount and an accumulated charge variation delta Q will be described. However, the number of holes and the number of electrons of the upper graphene or the lower graphene are equal. In addition, quantum capacitance does not take into consideration. As shown in FIG. 11, with respect to the upper graphene, when the doping amount is 0, a straight line showing the relationship between the carrier density n and the voltage V is a straight line A which passes the origin, and it is dark when the voltage V=0 (the transmittance is low), and when V is set to a positive voltage, it is bright (the transmittance is high). When the doping amount is increased, the straight line showing the relationship between the carrier density n and the voltage V shifts to the negative side of the voltage V in a parallel manner as straight lines B, C and D. In a case of the straight line D, that is, in the case where the doping amount is $3.75*10^{13}/cm^2$, since a range in which the carrier density n can be changed by voltage application is considerably and excessively narrowed, the doping is excessively performed. In a case of the straight line C, that is, in the case where the doping amount is $2.5*10^{13}/cm^2$, since the carrier density can be changed in a range of 0 to $5*10^{13}/cm^2$ by changing the voltage V to the positive side and negative side with V=0 as the center, the doping amount is the most suitable. In addition, as shown in FIG. 11, with respect to the lower graphene, when the doping amount is 0, a straight line showing a relationship between carrier density n and voltage V is a straight line E which passes the origin, and it is dark when the voltage V=0 (the transmittance is low), and when V is set to a positive voltage, it is bright (the transmittance is high). When the doping amount is increased, the straight line showing the relationship between the carrier density n and the voltage V shifts to the negative side of the voltage V in parallel manner as straight lines F, G and H. In a case of the straight line H, that is, in the case where the doping amount is $-3.75*10^{13}/cm^2$, since a range in which the carrier density n can be changed by voltage application is considerably and excessively narrowed, the doping is excessively performed. In a case of the straight line G, that is, in the case where the doping amount is $-2.5*10^{13}/cm^2$, since the carrier density can be changed in a range of 0 to $-5*10^{13}/cm^2$ by changing the voltage V to the positive side and negative side with V=0 as the center, the doping amount is the most suitable. As described above, since the doping has an effect of shifting an operation voltage range, it is possible to ultimately decrease the operation voltage to half of the voltage in the case where the doping is not performed as in the cases of the straight lines C and G.

Figure 12:
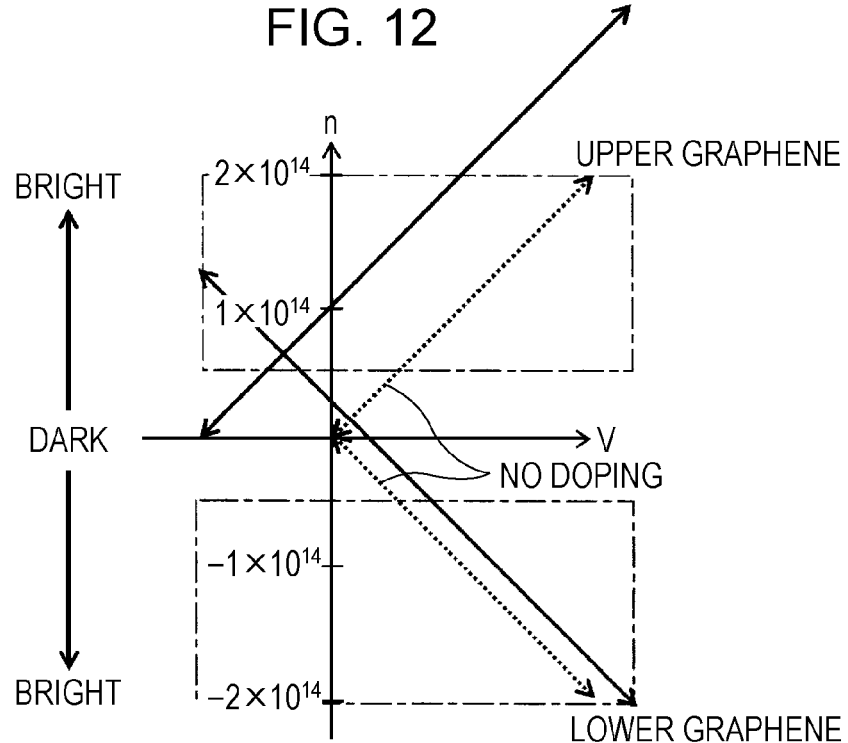
FIG. 12 is a schematic diagram showing a relationship between a doping amount and an accumulated charge variation delta Q.

FIG. 12 shows the relationship between the voltage V and the carrier density n when hole doping is performed on both upper graphene and lower graphene. In FIG. 12, a region surrounded by a dashed line represents a carrier density range of the visible light region. As shown in FIG. 12, it is advantageous in that a region in which both upper graphene and lower graphene are dark (the transmittance is low) is not present in this case. The same applies to the case where the electron is doped into both upper graphene and lower graphene.

Figure 13:
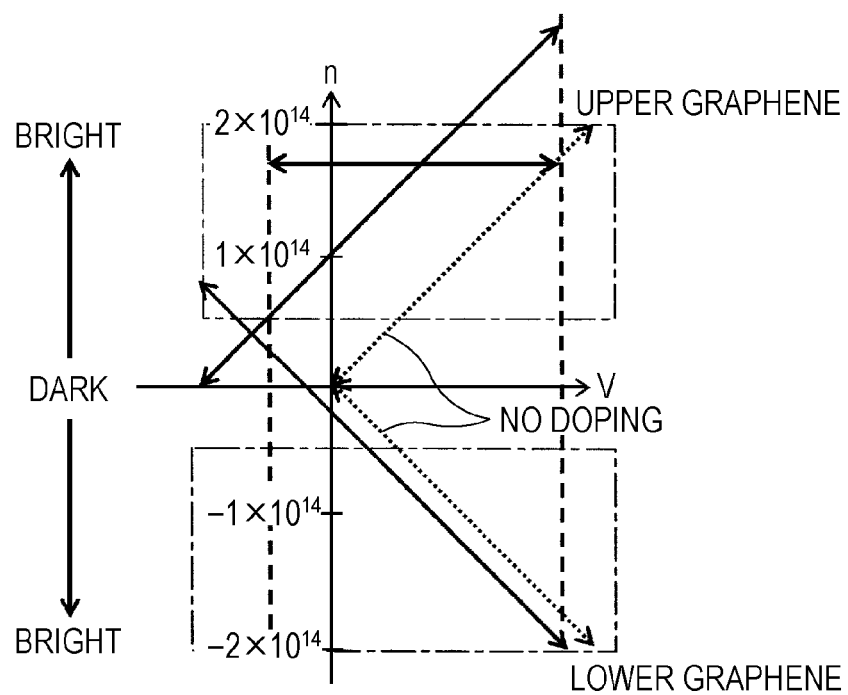
FIG. 13 is a schematic diagram showing a relationship between a doping amount and an accumulated charge variation delta Q.

FIG. 13 shows the relationship between the voltage V and the carrier density n when hole doping is performed on the upper graphene and electron doping is performed on the lower graphene. As shown in FIG. 13, in this case, while an effect of reducing the operation voltage with a small doping amount can be obtained, the effect of voltage reduction is limited to whichever has the smaller number of electrons or holes. The same applies to the case where the electron is doped into the upper graphene and the hole is doped into the lower graphene.

As the dielectric substance configuring the dielectric layer 11, an example of the optical modulator used in a ferroelectric substance will be described. Here, the case where PZT is used as the ferroelectric substance will be described.

Figure 14:
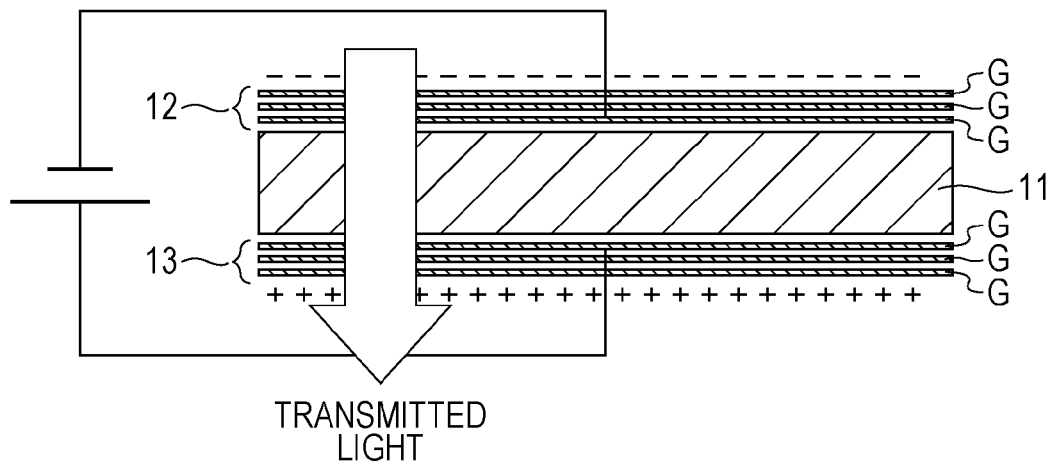
FIG. 14 is a schematic diagram showing a fourth configuration example of the optical modulator according to the first embodiment.

As shown in FIG. 14, both electrodes 12 and 13 are made of laminated graphene which is formed with three layers of graphene G. The dielectric layer 11 is formed with a PZT layer.

Figure 15:
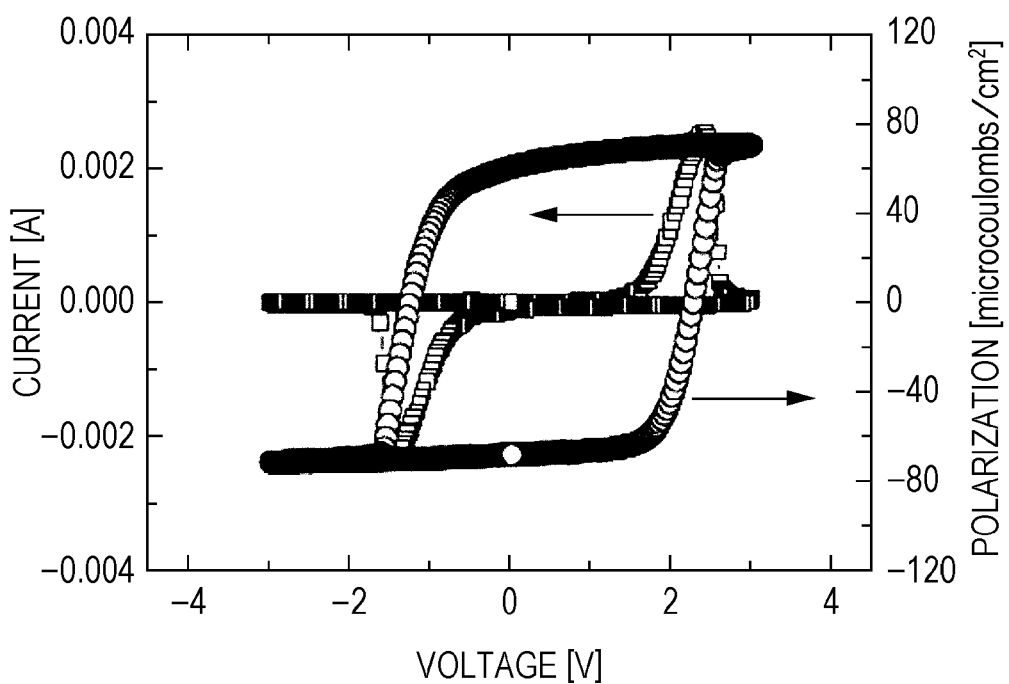
FIG. 15 shows a hysteresis curve of a PZT layer used as a dielectric layer in the fourth configuration example of the optical modulator according to the first embodiment.

FIG. 15 shows a hysteresis curve of the PZT layer (refer to NPL 4).

Figure 16:
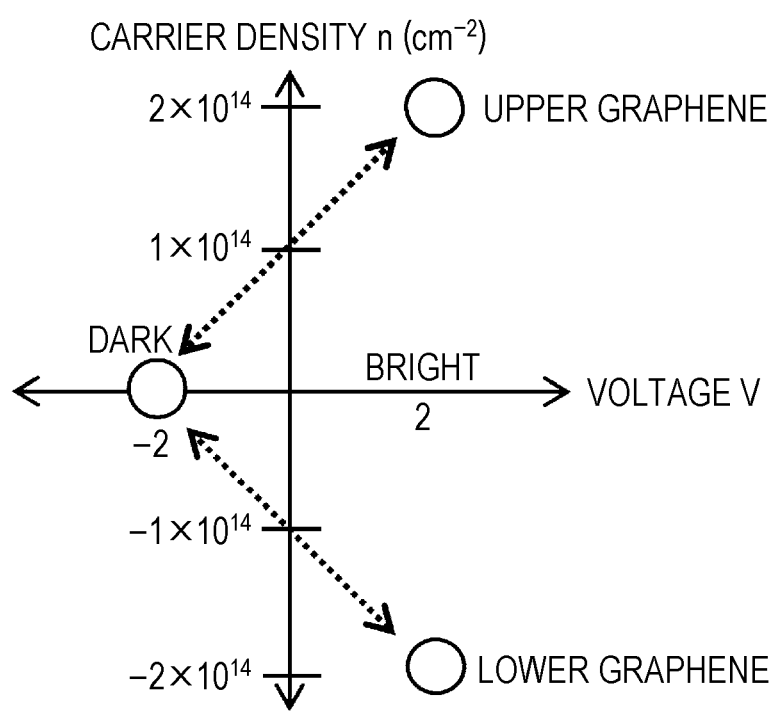
FIG. 16 is a schematic diagram showing a relationship between an applied voltage V and carrier density n in the fourth configuration example of the optical modulator according to the first embodiment.

FIG. 16 shows a relationship between the voltage V and the carrier density n accumulated in the laminated graphene. When chemical doping of $1*10^{14}/cm^2$ per layer is performed on each graphene G, the voltage V can be controlled in a range of $-2$ V to $+2$ V, and the carrier density n can be controlled in a range of 0 to $1*10^{14}/cm^2$.

It is possible to discontinuously switch a bright state (a state where the transmittance is high) and a dark state (a state where the transmittance is low) by the polarization reversal of the PZT layer. In this case, when the polarization reversal is $+/-60$ microcoulombs/$cm^2$, the transmittance modulation of about 6 * a =12%, with 3 layers of graphene on one side, a total of 6 layers, can be performed. When the polarization reversal is $+/-100$ microcoulombs/$cm^2$, the transmittance modulation of about 12*a=24%, with 6 layers of graphene on one side, a total of 12 layers, can be performed.

When the light having the wavelength of the infrared region is controlled in the optical modulator using the ferroelectric substance as the dielectric substance configuring the dielectric layer 11, the accumulated charge amount per layer of graphene may be equal to or less than 4 microcoulombs/cm$^2$. When the polarization reversal is +/−60 microcoulombs/cm$^2$, the transmittance modulation of about 30*a=60%, with 15 layers of graphene on one side, a total of 30 layers, can be performed. When the polarization reversal is +/−100 microcoulombs/cm$^2$, the transmittance modulation of 100%, with 25 layers of graphene on one side, a total of 50 layers, can be performed.

On one side alone, the transmittance modulation of equal to or more than 15% in the accumulated charge amount of equal to or more than +/−30 microcoulombs/cm$^2$ which can be easily obtained using PZT can be performed. When the threshold wavelength lambda$_{th}$ is a wavelength which longer than 780 nm, the transmittance modulation width is further increased.

Method of Manufacturing Optical Modulator

In manufacturing of the optical modulator, the electrode 12 which is formed on a second substrate (not shown) is bonded to an upper surface of the dielectric layer 11 after the dielectric layer 11 is formed on a first substrate (not shown). For example, when the electrode 12 is made of graphene, the second substrate on which the electrode 12 is formed may be copper foil on which the graphene is synthesized (grown) using the CVD method and the like and may be a substrate in which the graphene synthesized on the substrate such as copper foil is transferred onto another substrate. When chemical doping is performed on the graphene, a dopant layer is formed on the graphene.

Next, first, the first substrate on which dielectric layer 11 is formed is separated or removed from the dielectric layer 11 so that a lower surface of the dielectric layer 11 is exposed.

Next, the electrode 13 which is formed on a third substrate (not shown) is bonded to the lower surface of the dielectric layer 11. When the electrode 13 is made of graphene, the substrate on which the electrode 13 is formed may be copper foil on which the graphene is synthesized using the CVD method and the like and may be a substrate in which the graphene synthesized on the substrate such as copper foil is transferred onto another substrate. When chemical doping is performed on the graphene, a dopant layer is formed on the graphene.

Then, the third substrate is removed as necessary. By doing this, the desired optical modulator is manufactured.

Method of Operating Optical Modulator

As shown in FIG. 1, a direct current power supply 14 applies voltage V between the electrodes 12 and 13 which are provided on both surfaces of the dielectric layer 11 in the optical modulator and then, the transmitted light intensity of the light incident to the optical modulator is controlled according to the voltage V to perform optical modulation. More specifically, when the voltage is applied between the electrodes 12 and 13, the transmittance of one of the electrodes 12 and 13 which is formed with one layer or plural layers of graphene is increased in comparison with the case where the voltage V is not applied between the electrodes 12 and 13, that is, V=0, so that the transmitted light intensity of the light incident to the optical modulator is increased. As a specific example, the transmittance T is 86% at the time of not applying the voltage V, the transmittance T is 90% at the time of applying the voltage V, and the transmittance modulation width delta T is about 4% in the optical modulator shown in FIG. 3. In addition, when both electrodes 12 and 13 are formed with two layers of graphene G, electron doping is performed on the graphene G configuring the electrode 12, and hole doping is performed on the graphene G configuring the electrode 13, the transmittance T is 82% at the time of applying a negative voltage V, the transmittance T is 90% at the time of applying a positive voltage V, and the transmittance modulation width delta T is about 8% in the optical modulator shown in FIG. 4.

EXAMPLE 1

Figure 17:
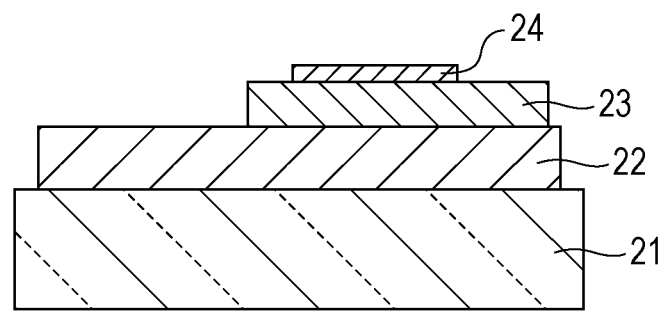
FIG. 17 is a cross-sectional view showing a configuration of an optical modulator according to Example 1.
Figure 18:
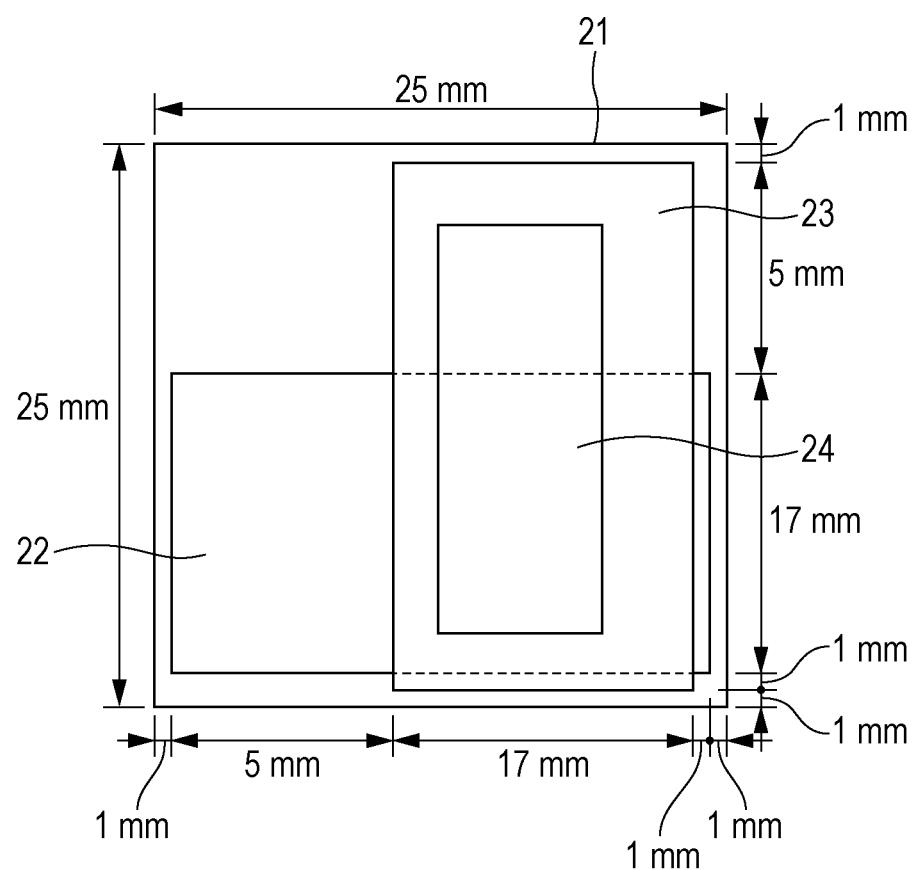
FIG. 18 is a plan view showing the configuration of the optical modulator according to Example 1.

As below, the optical modulator having a configuration shown in FIGS. 17 and 18 was manufactured. Here, FIG. 17 is a cross-sectional view and FIG. 18 is a plan view.

A metal mask (not shown) which has a rectangular opening having a size of 23 mm*17 mm was arranged on a quartz wafer 21 having a thickness of 1 mm which was cut into 25 mm*25 mm, and an indium tin oxide (ITO) target having a Sn content of 5% was used to form an ITO electrode 22 having a thickness of 90 nm using the RF sputtering method. Then, the metal mask was removed.

By doing this, metal masks having the same shape as the metal mask used in forming the ITO electrode 22 were arranged on the quartz wafer 21 on which the ITO electrode 22 was formed in a L shape as a whole, and a zirconia ($ZrO_2$) target was used to form a $ZrO_2$ layer 23 having a thickness of 250 nm using the RF sputtering method. Then, the metal masks were removed.

The rolled copper foil having a thickness of 36 micrometers was fired at 1000 degrees Celsius in an electric furnace under a hydrogen atmosphere (a hydrogen flow rate of 20 sccm), and metal gas was supplied at a flow rate of 30 sccm for 30 minutes to form graphene on the copper foil.

An acetone-diluted solution of polymethyl methacrylate (PMMA) was applied on the graphene which was formed on the copper foil in this manner by the spin coating and then, the solution was dried to form a PMMA film.

The copper foil on which the PMMA film was formed in this manner was immersed in an iron nitrate aqueous solution for about 40 minutes and the copper foil was removed. By doing this, a substrate in which the PMMA film was bonded on the graphene was obtained.

The graphene which was bonded to the PMMA film was transferred onto the $ZrO_2$ layer 23 of the quartz wafer 21.

Next, the quartz wafer 21 to which the graphene was transferred in this manner was immersed in an acetone solvent for 3 minutes and the PMMA film was removed. In FIGS. 17 and 18, the graphene is indicated by a symbol 24.

Then, electrode wiring (not shown) was formed on the ITO electrode 22 and the graphene 24 by wire bonding.

As above, the optical modulator was manufactured. The size of each part of the optical modulator is shown in FIG. 18.

The voltage was applied between the ITO electrode 22 and the graphene 24 of the optical modulator so that the graphene 24 had a high potential in relation to the ITO electrode 22 and the transmittance modulation was measured.

Figure 19:
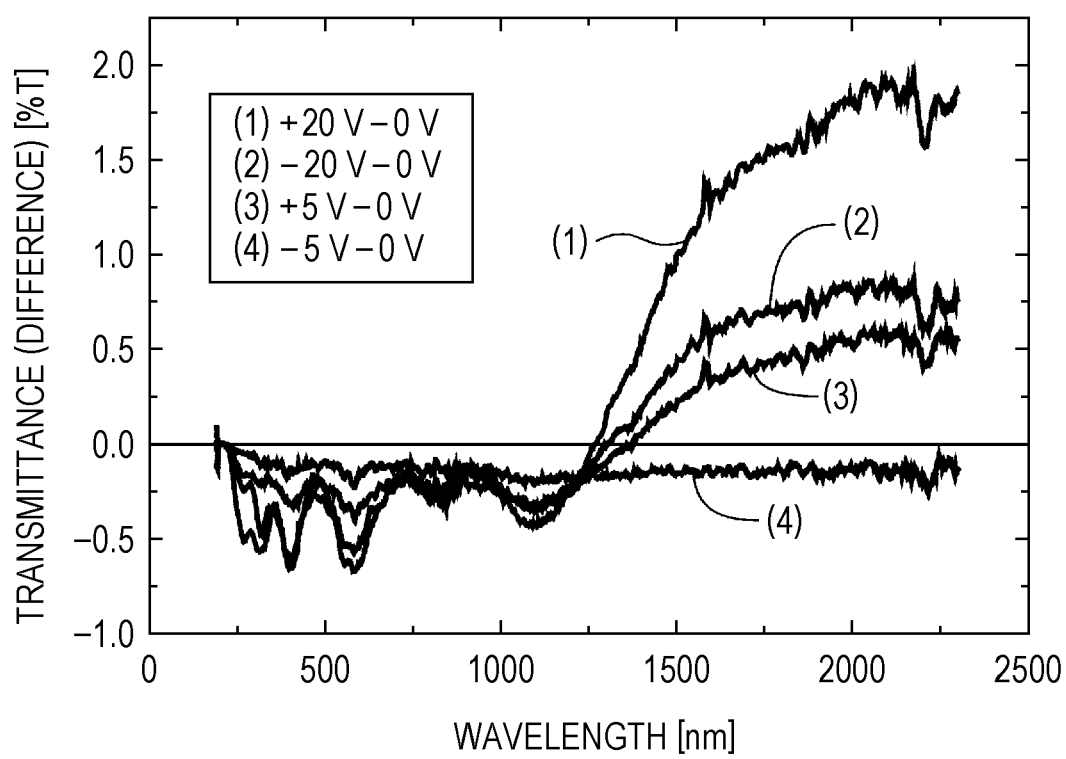
FIG. 19 is a schematic diagram showing a measurement result of a transmission spectrum by changing voltage applied to the optical modulator according to Example 1.
Figure 20:
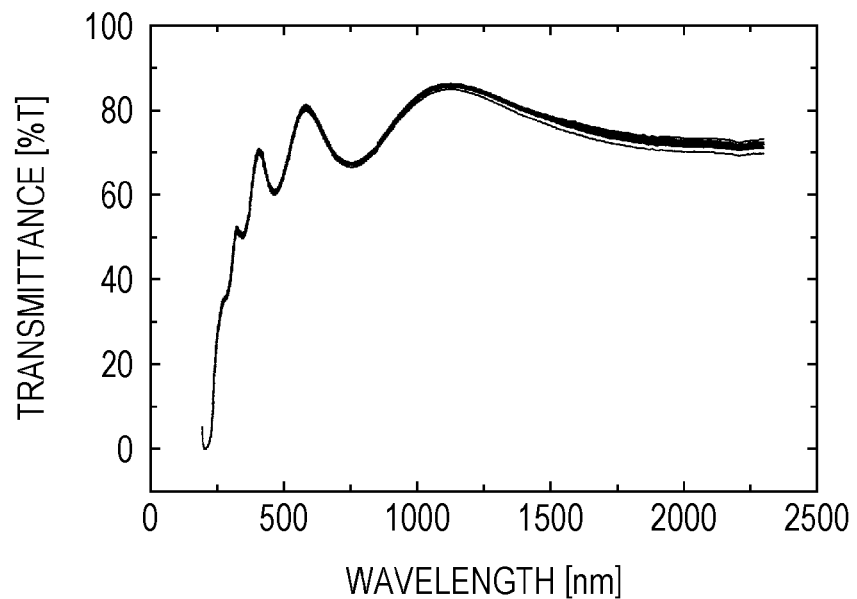
FIG. 20 is a schematic diagram showing a measurement result of a transmission spectrum by changing voltage applied to the optical modulator according to Example 1.
Figure 21:
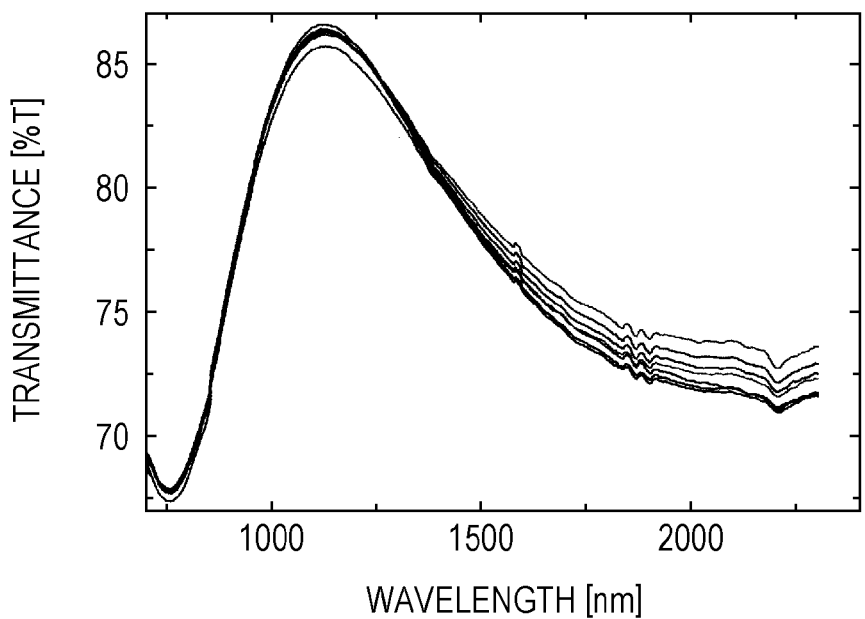
FIG. 21 is a schematic diagram showing an enlarged part of the transmission spectrum shown in FIG. 20.

FIG. 19 shows a measurement result of a transmission spectrum (difference) of the optical modulator. Here, the transmission spectrum (difference) is obtained by subtracting the transmission spectrum when the voltage is 0 V between the ITO electrode 22 and the graphene 24 from the transmission spectrum when the voltage is applied between the ITO electrode 22 and the graphene 24 in order of 20 V, −20 V, 5 V, −5 V and 0 V. FIG. 20 is a view showing a transmission spectrum of the optical modulator and FIG. 21 is an enlarged view showing a part of the transmission spectrum.

EXAMPLE 2

A metal mask (not shown) which has a rectangular opening having a size of 23 mm*17 mm was arranged on a quartz wafer having a thickness of 1 mm which was cut into 25 mm*25 mm, and an indium tin oxide (ITO) target having a Sn content of 5% was used to form an ITO electrode having a thickness of 90 nm using the RF sputtering method. Then, the metal mask was removed.

By doing this, metal masks having the same shape as the metal mask used in forming the ITO electrode were arranged on the quartz wafer on which the ITO electrode was formed in a L shape as a whole, and an alumina ($Al_2O_3$) target was used to form an $Al_2O_3$ layer having a thickness of 250 nm using the RF sputtering method.

The rolled copper foil having a thickness of 36 micrometers was fired at 1000 degrees Celsius in an electric furnace under a hydrogen atmosphere (a hydrogen flow rate of 40 sccm), and metal gas was supplied at a flow rate of 30 sccm for 30 minutes to form graphene on the copper foil.

An acetone-diluted solution of polymethyl methacrylate (PMMA) was applied on the graphene which was formed on the copper foil in this manner by the spin coating and then, the solution was dried to form a PMMA film.

The copper foil on which the PMMA film was formed in this manner was immersed in an iron nitrate aqueous solution for about 40 minutes and the copper foil was removed. By doing this, a substrate in which the PMMA film was bonded onto the graphene was obtained.

The graphene which was bonded to the PMMA film was transferred onto the $Al_2O_3$ layer of the quartz wafer.

Next, the quartz wafer 21 to which the graphene was transferred in this manner was immersed in an acetone solvent for 3 minutes and the PMMA film was removed.

Then, electrode wiring (not shown) was formed on the ITO electrode and the graphene by wire bonding.

As above, the optical modulator was manufactured. The size of each part of the optical modulator is shown in FIG. 18.

The direct current power supply was connected between the ITO electrode and the graphene of the optical modulator, the voltage in a range of +70 V to −70 V was applied so that the graphene had a high potential between the ITO electrode and the graphene and the transmittance modulation of the infrared region was measured.

Figure 22:
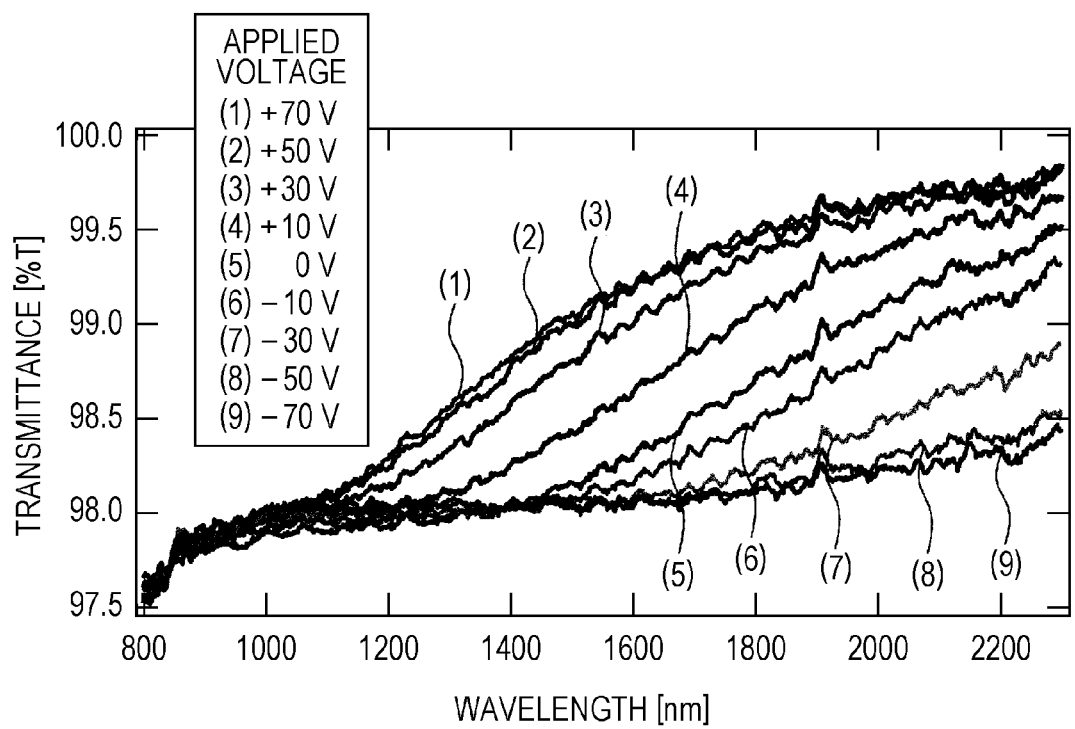
FIG. 22 is a schematic diagram showing a measurement result of a transmission spectrum by changing voltage applied to an optical modulator according to Example 2.

FIG. 22 shows the measure result of the transmission spectrum of the optical modulator. As seen from FIG. 22, the transmittance can be controlled by the voltage in the infrared region and good transmittance modulation properties can be obtained.

EXAMPLE 3

Graphene was transferred onto the entire surface of an 8-inch transparent glass wafer using the same method as in Example 1.

A resist pattern corresponding to an electrode of a parallel plate condenser and a pixel shape of an image sensor was formed on the graphene by the photolithography.

The graphene which was formed on the transparent glass wafer in this manner was subjected to a nitrogen plasma treatment having an output of 5 W and an n-type dopant layer was formed on the graphene to perform electron doping.

An alumina ($Al_2O_3$) target was used to form an $Al_2O_3$ layer having a thickness of 5 nm on the graphene on which the electron doping was performed in this manner.

A PZT target was used to form a PZT layer having a thickness of 30 nm on the wafer on which the $Al_2O_3$ layer was formed in this manner.

The graphene was transferred onto the entire surface of the wafer.

A resist pattern corresponding to an electrode of a parallel plate condenser and a pixel shape of an image sensor was formed on the graphene by the photolithography.

A nitromethane solution of $AuCl_3$ was sprayed to form a film on the graphene and a p-type dopant layer was formed on the graphene to perform hole doping.

Then, copper wiring was formed in the upper and lower graphene electrodes.

EXAMPLE 4

4-methoxy benzylidene-4'-butylaniline (MBBA) was sealed in a cell as a negative type liquid crystal which is normally black.

The graphene was transferred onto the entire surfaces of both ends of the cell.

A resist pattern corresponding to an electrode of a parallel plate condenser and a pixel shape of an image sensor was formed on the graphene by the photolithography.

The cell in which the graphene was formed in this manner was subjected to a nitrogen plasma treatment having an output of 5 W and an n-type dopant layer was formed on the graphene to perform n-type doping.

A nitromethane solution of $AuCl_3$ was sprayed to form a film on the graphene and a p-type dopant layer was formed on the graphene to perform hole doping.

Then, copper wiring was formed in the upper and lower graphene electrodes.

In the optical modulator according to the first embodiment, it is possible to obtain various advantages as below. That is, the optical modulator can easily perform optical modulation by applying the voltage between the electrodes 12 and 13. In addition, since at least one of the electrodes 12 and 13 is formed with one layer of graphene or laminated graphene, the graphene has a high absorption coefficient so that the light intensity region capable of optical modulation can be widely designed. Moreover, the optical modulation can be performed from infrared light to visible light by selecting the number of layers of graphene configuring the electrodes 12 and 13 and using chemical doping to the graphene together. Since the graphene is a two-dimensional high mobility material, the optical modulator can be operated at a high speed and, for example, when the resistance of the electrodes 12 and 13 is equal to or less than 1 kilohm, the response speed is equal to or more than 1 GHz. In addition, it is not necessary for the to provide a large-scale driving unit such as a mechanical shutter. Moreover, since the optical modulator has a flat transmission spectrum, hue is neutral. When white light is incident to the optical modulator, the loss in transmitted light is small in comparison with a liquid crystal. This is because there is no diffused reflection by liquid crystal molecules generated in the case where a liquid crystal is used. Since the optical modulator employs a voltage driving mode, electricity consumption is small. Only low driving voltage is necessary. Since the optical modulator has a structure in which the electrodes 12 and 13 are formed on both surfaces of the dielectric layer 11, thinning and reduction can be easily obtained. In addition, since the optical modulator has a parallel plate condenser structure, the manufacture process is simple. Moreover, since the graphene configuring at least one of the electrodes 12 and 13 has a thickness of an atomic layer, the optical modulator has small loss in transmitted light by reflection.

2. Second Embodiment

Optical Modulator

An optical modulator according to a second embodiment, one of the electrodes 12 and 13 is formed with one layer of graphene or laminated graphene, and metal nanoparticle or metal nanowires are formed on the graphene. Then, the surface plasmon polaritons of the metal nanoparticles or metal nanowires are used to increase a transmittance modulation width delta T per layer of graphene to equal to or more than 2.3%. An effect that can be obtained from the metal nanoparticle or the metal nanowire is known in the related art. The optical modulator is the same as the optical modulator according to the first embodiment except the above description.

Method of Manufacturing Optical Modulator

A method of manufacturing the optical modulator is the same as the method of manufacturing the optical modulator according to the first embodiment except that metal nanoparticle or metal nanowires are formed on the graphene.

Method of Operating Optical Modulator

A method of operating the optical modulator is the same as in the first embodiment.

According to the second embodiment, the same advantages as in the first embodiment can be obtained.

3. Third Embodiment

Optical Modulator

In an optical modulator according to a third embodiment, the entire thickness of the dielectric layer 11 and the electrodes 12 and 13 is set so that light having a wavelength which performs optical modulation is reflected inside thereof in a multiple manner to increase a transmittance modulation width delta T per layer of graphene to equal to or more than 2.3%, for example. The optical modulator is the same as the optical modulator according to the first embodiment except the above description.

Method of Manufacturing Optical Modulator

A method of manufacturing the optical modulator is the same as the method of manufacturing the optical modulator according to the first embodiment except that the entire thickness of the dielectric layer 11 and the electrodes 12 and 13 is set as above.

Method of Operating Optical Modulator

A method of operating the optical modulator is the same as in the first embodiment.

According to the third embodiment, the same advantages as in the first embodiment can be obtained.

4. Fourth Embodiment

Optical Modulator

In an optical modulator according to a fourth embodiment, an optical adjustment layer is laminated in order to release the wavelength dependence of optical modulation quantity generated to improve the optical modulation quantity in the optical modulator according to the first embodiment. Specifically, for example, graphene is formed on the dielectric layer 11 through the optical adjustment layer. For the optical adjustment layer, a refractive index, thickness and the like can be selected so as to release the wavelength dependence of optical modulation quantity. As the optical adjustment layer, for example, a $SiO_2$ film can be used. The optical modulator is the same as the optical modulator according to the first embodiment except the above description.

Method of Manufacturing Optical Modulator

A method of manufacturing the optical modulator is the same as the method of manufacturing the optical modulator according to the first embodiment except that the optical adjustment layer is laminated.

Method of Operating Optical Modulator

A method of operating the optical modulator is the same as in the first embodiment.

According to the fourth embodiment, the same advantages as in the first embodiment can be obtained.

5. Fifth Embodiment

Optical Modulator

Figure 23:
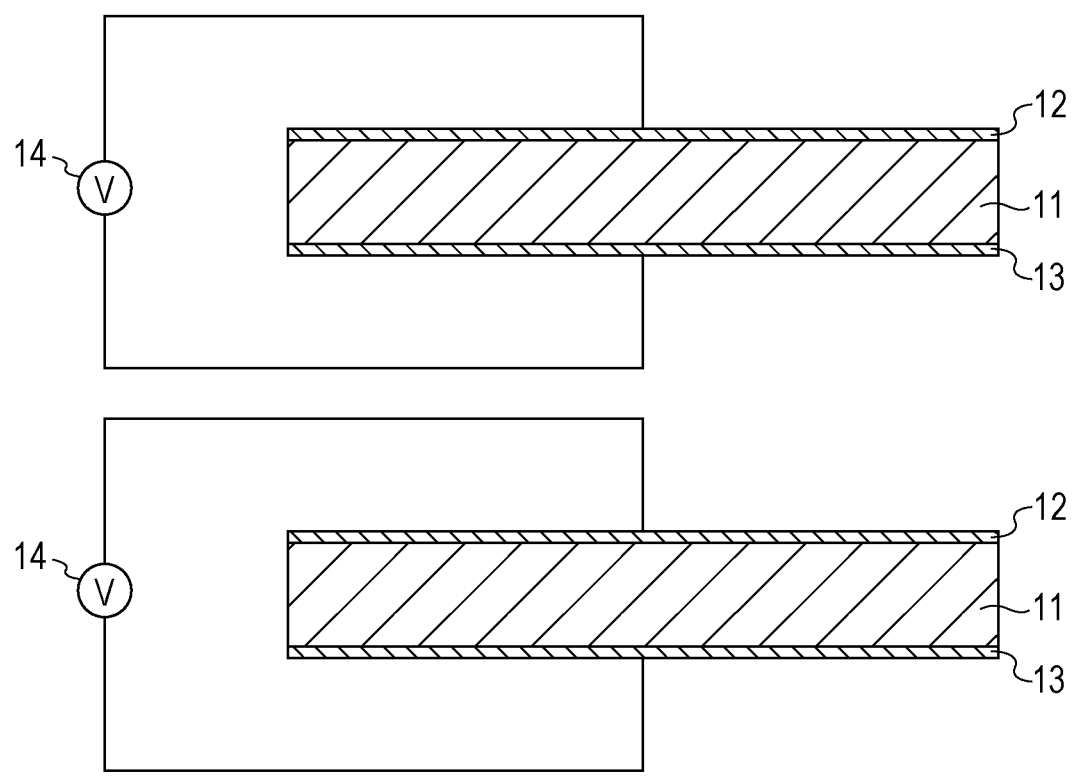
FIG. 23 is a schematic diagram showing an optical modulator according to a fifth embodiment.

FIG. 23 shows an optical modulator according to a fifth embodiment. As shown in FIG. 23, the optical modulator is configured such that the optical modulators according to the first embodiment are arranged in plural stages in a light incident direction. That is, the incident light is incident to the optical modulator on the first stage and is sequentially transmitted from the optical modulator on the first stage to the optical modulator on the last stage to be emitted from the optical modulator on the last stage. The respective optical modulators may be directly connected to each other or may separate from each other. While FIG. 23 shows an example in which the optical modulators are arranged in two stages, the number of stages of the optical modulator to be arranged may be arbitrary number of stages of equal to or more than three stages.

Figure 24:
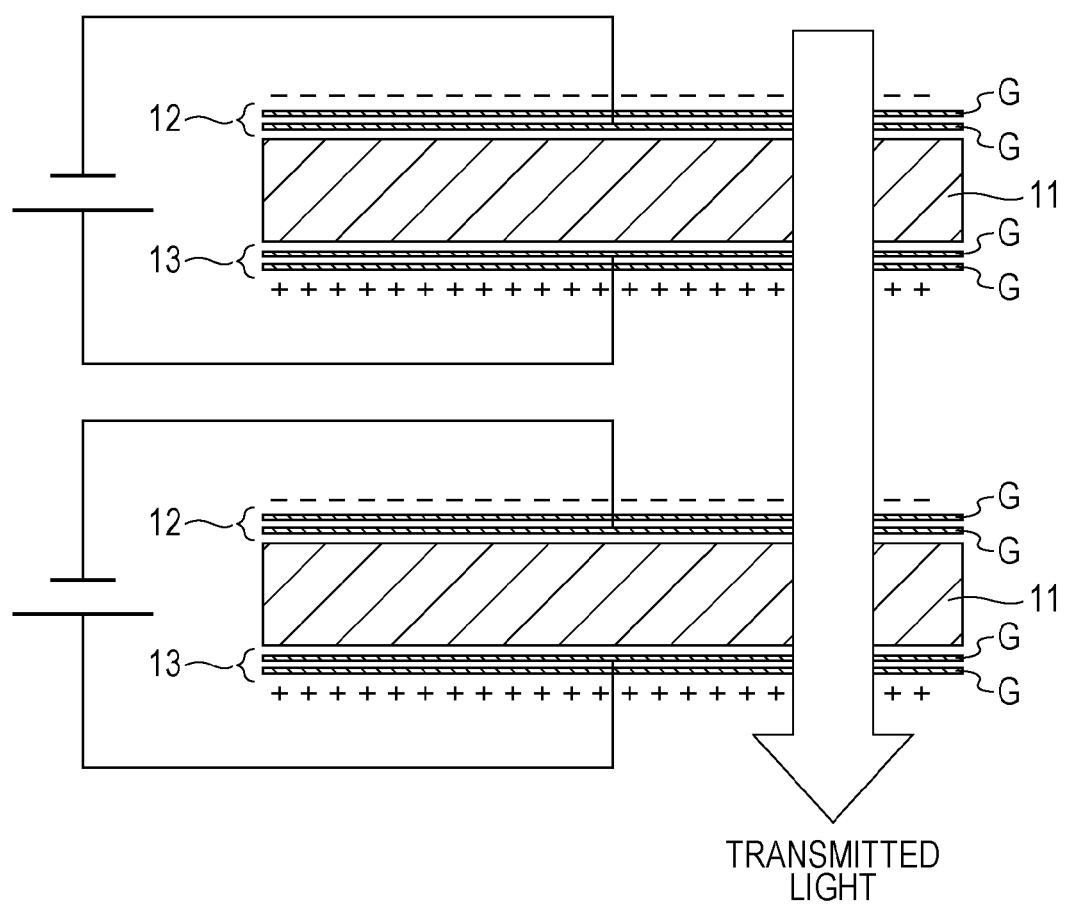
FIG. 24 is a schematic diagram showing a configuration example of the optical modulator according to the fifth embodiment.

FIG. 24 shows a specific example of the optical modulator. As shown in FIG. 24, in the optical modulator, both electrodes 12 and 13 of the each of the optical modulators is formed with laminated graphene formed with two layers of graphene. Accordingly, the total number of graphene in the optical modulator is 8 layers and the transmittance modulation width delta T is about a*8=16%.

Method of Manufacturing Optical Modulator

It is possible to manufacture the optical modulator by arranging the optical modulators according to the first embodiment in plural stages.

Method of Operating Optical Modulator

The optical modulator is the same as the optical modulator according to the first embodiment except that the transmittance of each of the optical modulators is modulated by independently or simultaneously controlling the voltage which is applied between the electrodes 12 and 13 of each of the optical modulators to perform optical modulation.

According to the fifth embodiment, it is possible to obtain an advantage that the transmittance modulation width can be increased depending on the number of stages of the optical modulator, as well as the advantages of the first embodiment.

6. Sixth Embodiment

Optical Modulator

Figure 25:
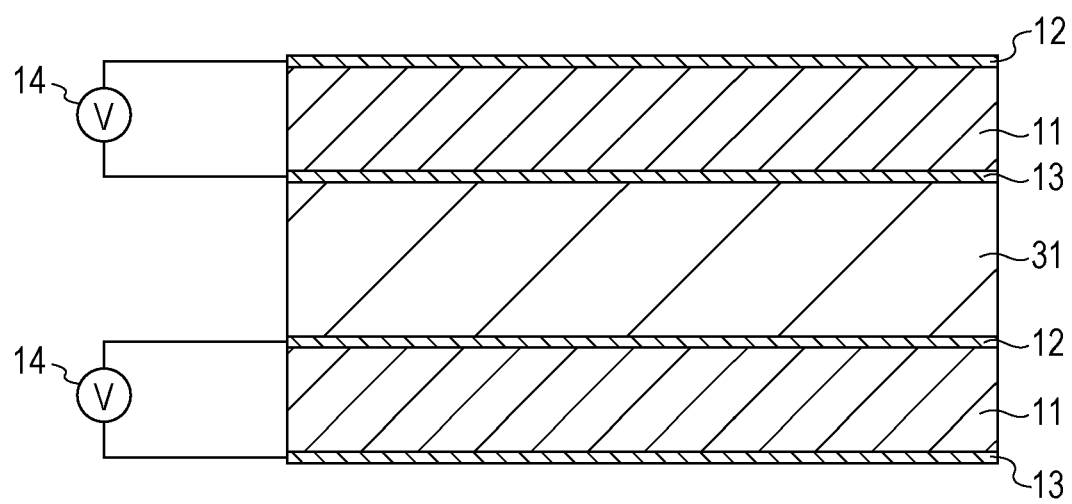
FIG. 25 is a schematic diagram showing an optical modulator according to a sixth embodiment.

FIG. 25 shows an optical modulator according to a sixth embodiment. As shown in FIG. 25, the optical modulator according to the sixth embodiment is configured by serially connecting the optical modulators according to the first embodiment in plural stages in a light incident direction through a dielectric layer 31. That is, the incident light is incident to the optical modulator on the first stage and is sequentially transmitted from the optical modulator on the first stage to the optical modulator on the last stage through the dielectric layer 31 to be emitted from the optical modulator on the last stage. While FIG. 25 shows an example in which the optical modulators are arranged in two stages, the number of stages of the optical modulator to be arranged may be arbitrary number of stages of equal to or more than three stages. That is, plural structures in which the dielectric layer 31 is interposed between the optical modulators or the repeated structure may be employed.

For example, the dielectric layer 11 of each of the optical modulators is made of a high dielectric substance or a ferroelectric substance, and a dielectric layer 60 is made of a low dielectric substance.

Figure 26:
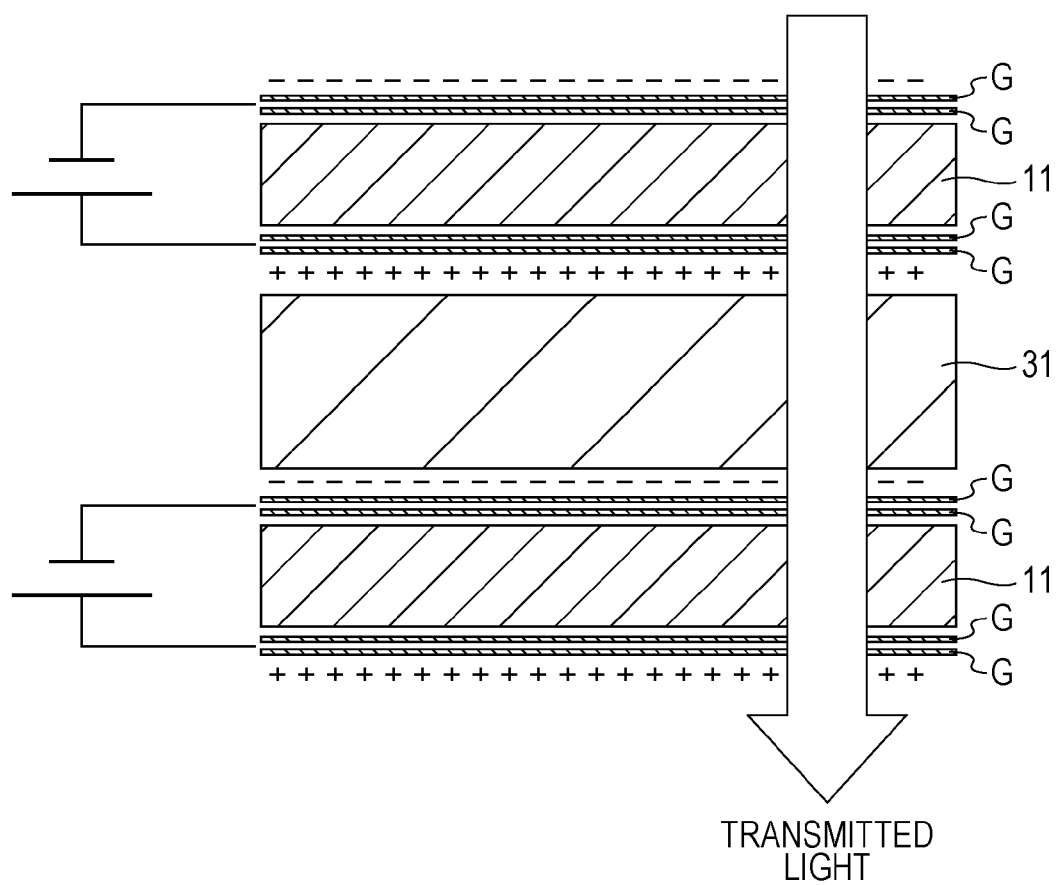
FIG. 26 is a schematic diagram showing a configuration example of the optical modulator according to the sixth embodiment.

FIG. 26 shows a specific example of the optical modulator. As shown in FIG. 26, in the optical modulator, both electrodes 12 and 13 of the each of the optical modulators is formed with laminated graphene formed with two layers of graphene. Accordingly, the total number of graphene in the optical modulator is 8 layers and the transmittance modulation width delta T is about a*8=16%.

Method of Manufacturing Optical Modulator

It is possible to manufacture the optical modulator by arranging the optical modulators according to the first embodiment in plural stages through the dielectric layer 31.

Method of Operating Optical Modulator

The optical modulator is the same as the optical modulator according to the first embodiment except that the transmittance of each of the optical modulators is modulated by independently or simultaneously controlling the voltage which is applied between the electrodes 12 and 13 of each of the optical modulators to perform optical modulation.

According to the sixth embodiment, it is possible to obtain the same advantages as in the fifth embodiment.

7. Seventh Embodiment

Optical Modulator

Figure 27:
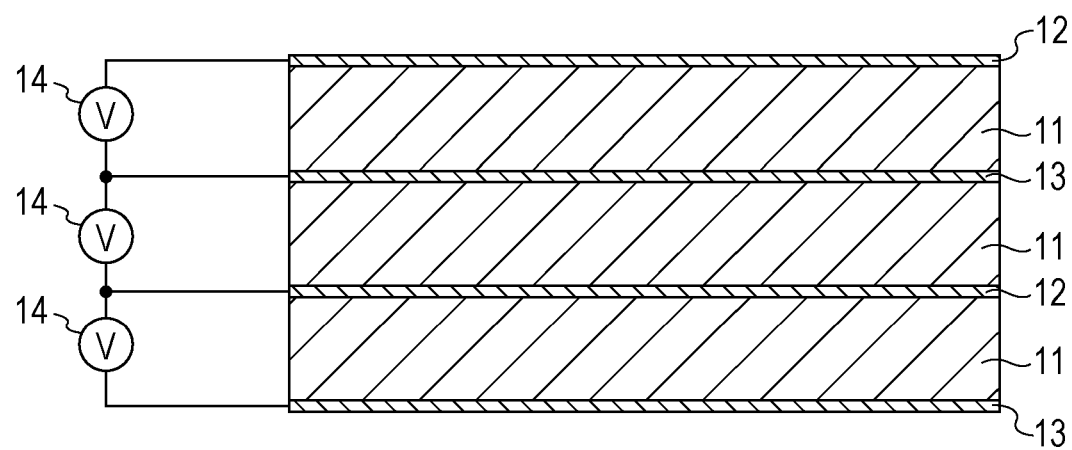
FIG. 27 is a schematic diagram showing an optical modulator according to a seventh embodiment.

FIG. 27 shows an optical modulator according to a seventh embodiment. As shown in FIG. 27, the optical modulator according to the seventh embodiment is configured by serially connecting the optical modulators according to the first embodiment in plural stages in a light incident direction. That is, the incident light is incident to the optical modulator on the first stage and is sequentially transmitted from the optical modulator on the first stage to the optical modulator on the last stage to be emitted from the optical modulator on the last stage. The electrode 13 or the electrode 12 is used between two adjacent optical modulators in a combined manner. While FIG. 27 shows an example in which the optical modulators are arranged in three stages, the number of stages of the optical modulator to be arranged may be arbitrary number of stages of equal to or more than four stages.

Figure 28:
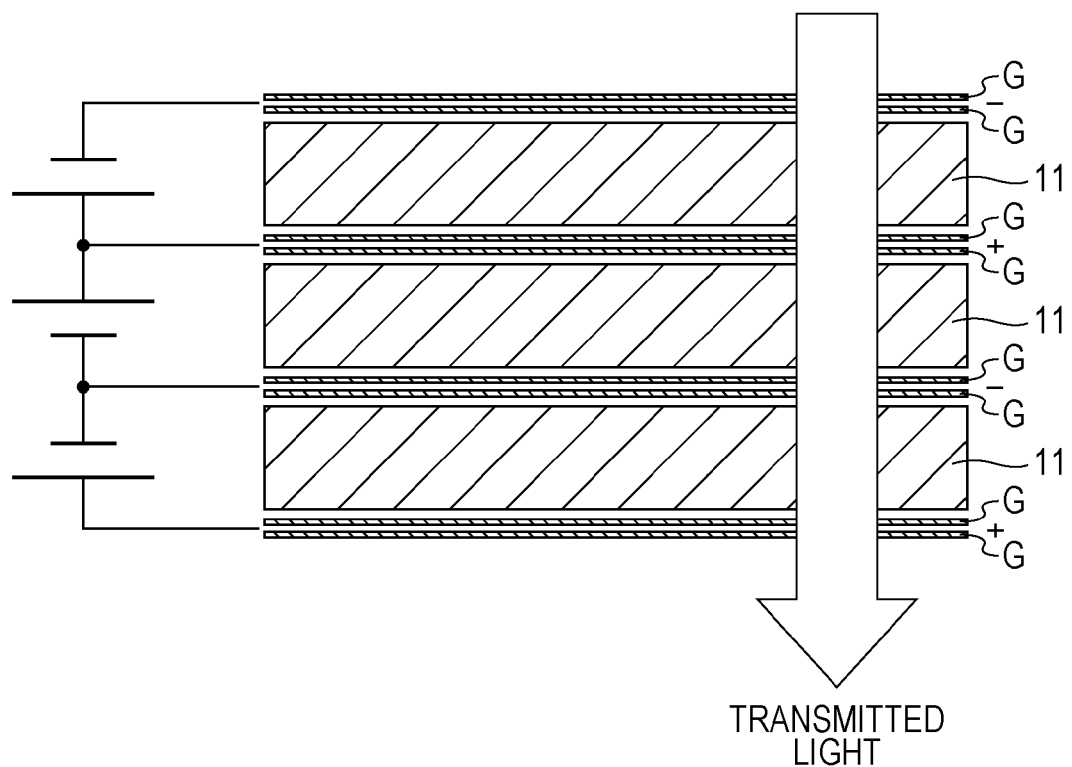
FIG. 28 is a schematic diagram showing a configuration example of the optical modulator according to the seventh embodiment.

FIG. 28 shows a specific example of the optical modulator. As shown in FIG. 28, in the optical modulator, both electrodes 12 and 13 of the each of the optical modulators is formed with laminated graphene formed with two layers of graphene. Accordingly, the total number of graphene in the optical modulator is 8 layers and the transmittance modulation width delta T is about a*8=16%.

Method of Manufacturing Optical Modulator

It is possible to manufacture the optical modulator by serially connecting the optical modulators according to the first embodiment in plural stages using the electrode 12 or the electrode 13 in a combined manner.

Method of Operating Optical Modulator

The optical modulator is the same as the optical modulator according to the first embodiment except that the transmittance of each of the optical modulators is modulated by independently or simultaneously controlling the voltage which is applied between the electrodes 12 and 13 of each of the optical modulators to perform optical modulation.

According to the seventh embodiment, it is possible to obtain the same advantages as in the fifth embodiment.

8. Eighth Embodiment

Image Sensor Module

An image sensor module according to an eighth embodiment will be described.

Figure 29:
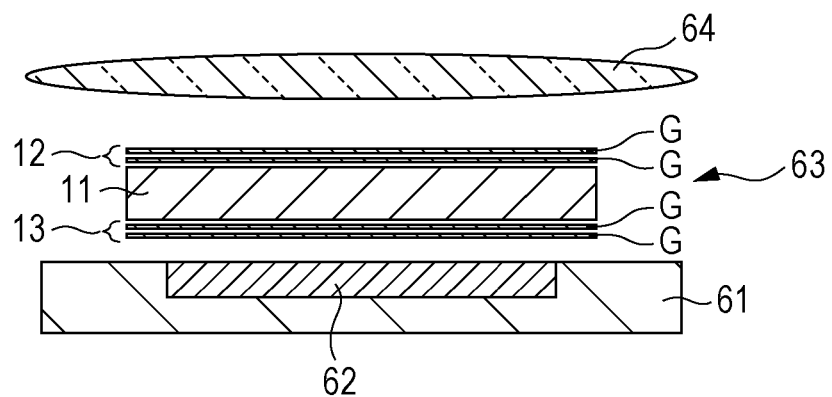
FIG. 29 is a schematic diagram showing an image sensor module according to an eighth embodiment.

FIG. 29 shows the image sensor module. As shown in FIG. 29, in the image sensor module, an optical modulator 63 is mounted on a solid state imaging device in which a photodiode 62 is provided on a semiconductor substrate 61 such as a Si substrate as a light receiving unit and a condensing lens 64 is provided thereon. In the solid state imaging device, while a photodiode is practically formed in each pixel, these photodiode are collected and represented as one photodiode 62 in FIG. 29. As the optical modulator 63, any one of the optical modulators according to the first to seventh embodiments may be used and the optical modulator in FIG. 4 is shown in FIG. 29 as an example.

Method of Manufacturing Image Sensor Module

The image sensor module can be manufactured such that after the photodiode 62 is formed on the semiconductor substrate 61 to form the solid state imaging device, the optical modulator 63 which is manufactured in advance is mounted on the solid state imaging device to provide the condensing lens 64 above the optical modulator 63.

Method of Operating Image Sensor Module

Light is incident to the optical modulator 63 through the condensing lens 64 of the image sensor module. At this time, the voltage according to incident light intensity is applied between the electrodes 12 and 13 of the optical modulator 63 and transmittance modulation is performed to control light intensity incident to the photodiode 62.

According to the eighth embodiment, it is possible to realize the image sensor module which can electrically control the incident light intensity to the most suitable light intensity at a high speed.

9. Ninth Embodiment

Solid State Imaging Device

Figure 30:
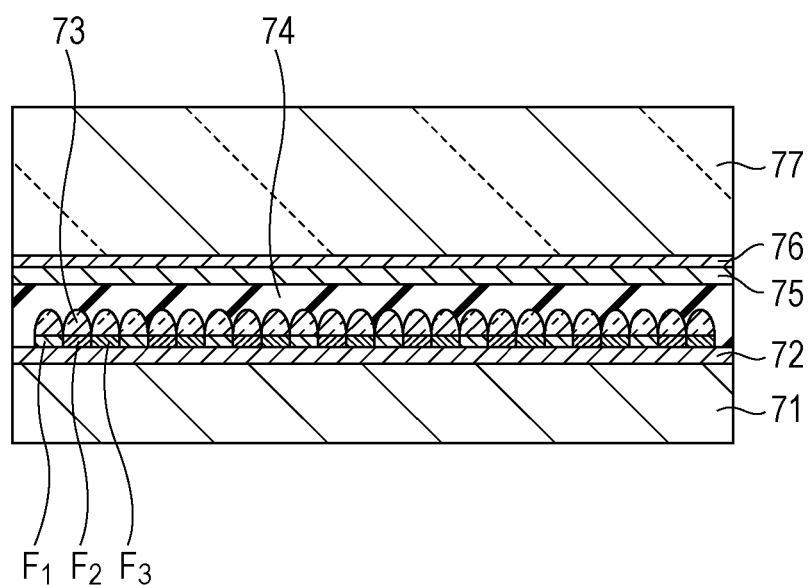
FIG. 30 is a schematic diagram showing a solid state imaging device according to a ninth embodiment.
Figure 31:
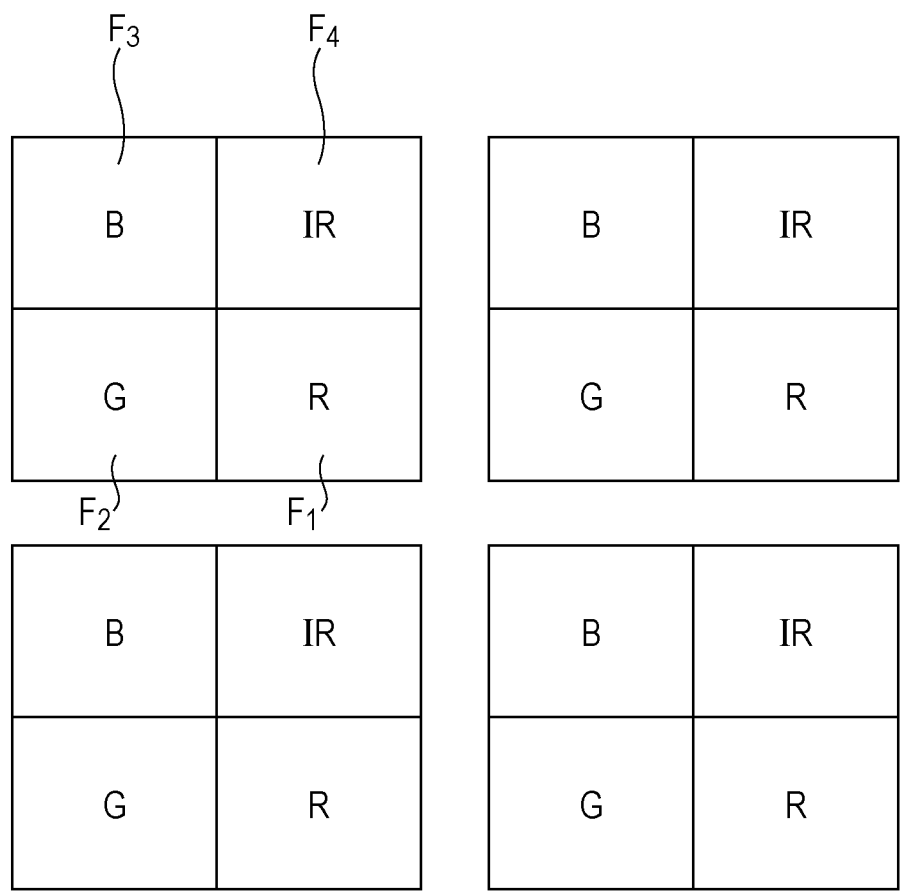
FIG. 31 is a schematic diagram showing an example of a pixel arrangement in the solid state imaging device according to the ninth embodiment.

FIG. 30 shows a solid state imaging device according to a ninth embodiment. As shown in FIG. 30, in the solid state imaging device, a photodiode 72 is provided on a semiconductor substrate 71 such as a Si substrate. While a photodiode is practically formed in each pixel, these photodiode are collected and represented as the photodiode 72 in FIG. 30. On the photodiode 72, a color filter is formed in each of plural pixels arranged in a matrix shape. For example, four pixels of a pixel for red (R), a pixel for green (G), a pixel for blue (B) and a pixel for infrared light (IR) form a section. In the color filter, a filter for R $F_1$, a filter for G $F_2$, a filter for B $F_3$ and a filter for IR $F_4$ (not shown in FIG. 30) are formed in a predetermined arrangement for each pixel. An example of an arrangement of each pixel is shown in FIG. 31. In addition, each of condensing lenses 73 forming a microlens array is formed on each of the filters $F_1$ to $F_4$. A flattened film 74 formed with an insulating film having a low refractive index is formed on the microlens array. Wiring 75 is formed on the flattened film 74. The wiring 75 is made of a material transparent to the light having a wavelength to perform optical modulation. An optical modulator 76 is formed on the wiring 75 and a glass substrate 77 is formed thereon. The optical modulator 76 is formed on the entire light receiving surface of the solid state imaging device. As the optical modulator 76, any one of the optical modulators according to the first to seventh embodiments can be used. One electrode of the optical modulator 76, for example, the electrode 13 is electrically connected to the wiring 75.

Method of Operating Solid State Imaging Device

Light is incident to the optical modulator 76 through the glass substrate 77 of the solid state imaging device. At this time, the voltage according to incident light intensity is applied between the electrodes 12 and 13 of the optical modulator 76 and transmittance modulation is performed to control light intensity incident to a pixel portion. In this case, all pixels have the same transmittance modulation width.

According to the ninth embodiment, it is possible to realize the solid state imaging device which can electrically control the incident light intensity to the most suitable light intensity at a high speed. For example, the solid state imaging device is suitably used for a CMOS image sensor, a CCD image sensor, or the like.

10. Tenth Embodiment

Solid State Imaging Device

Figure 32:
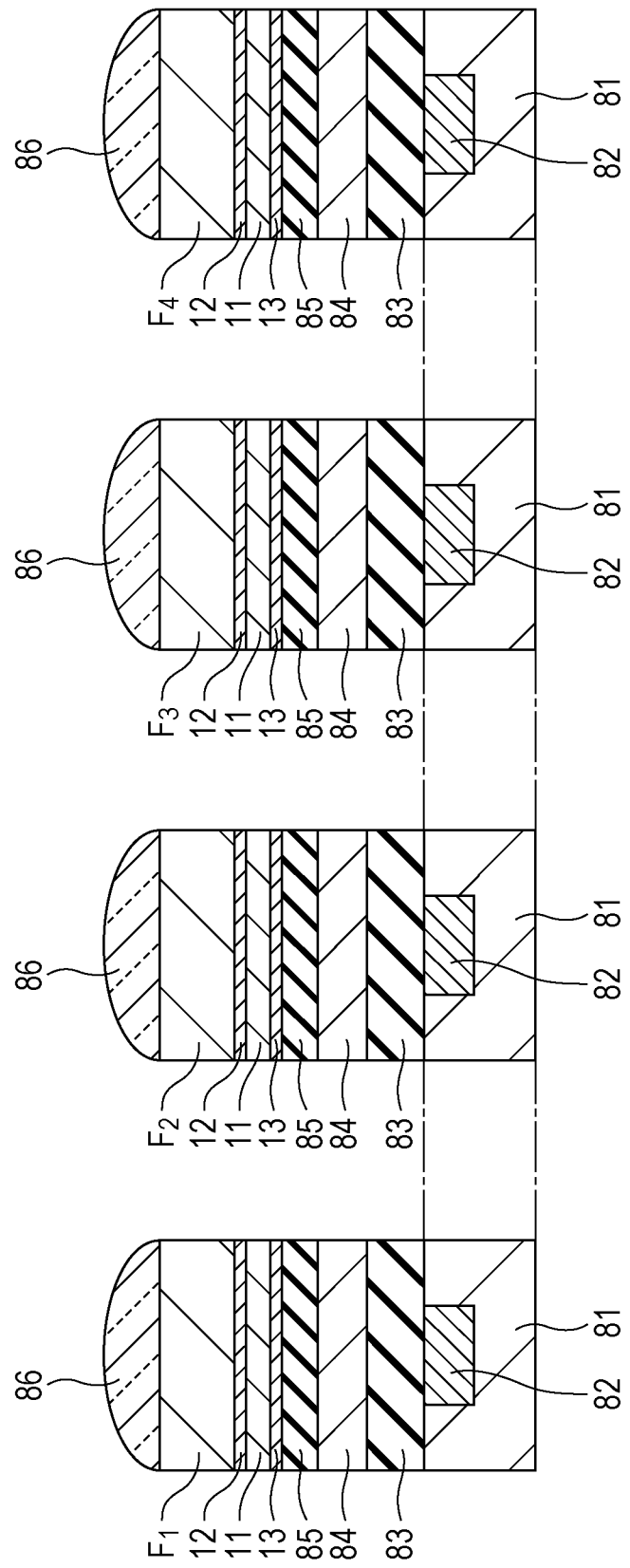
FIG. 32 is a schematic diagram showing a solid state imaging device according to a tenth embodiment.

FIG. 32 shows a solid state imaging device according to a tenth embodiment. As shown in FIG. 32, a photodiode 82 is formed in a portion which is immediately below each filter $F_1$ to $F_4$ of a semiconductor substrate 81 such as a Si substrate in the solid state imaging device. An interlayer insulation film 83 made of a $SiO_2$ film, a protection film 84 and a flattened film 85 are formed on each of the photodiodes 82 in order. An optical modulator in which the electrodes 12 and 13 are provided on both surfaces of the dielectric layer 11 is formed on the flattened film 85. As the optical modulator, any one of the optical modulators according to the first to seventh embodiments can be used. The filter $F_1$ is formed on the optical modulator of the pixel for R, the filter $F_2$ is formed on the optical modulator of the pixel for G, the filter $F_3$ is formed on the optical modulator of the pixel for B, and the filter $F_4$ is formed on the optical modulator of the pixel for IR. A condensing lens 86 is formed on each of the Filters $F_1$ to $F_4$. Here the optical modulator may be provided in each section which is formed with four pixels of the pixel for R, the pixel for G, the pixel for B and the pixel for IR.

Method of Operating Solid State Imaging Device

Light is incident to the solid state imaging device. At this time, the voltage according to incident light intensity is applied between the electrodes 12 and 13 in the optical modulator which is provided in each pixel or each section and transmittance modulation is performed to control light intensity incident to each pixel or each section.

According to the tenth embodiment, it is possible to realize the solid state imaging device which can electrically control the incident light intensity to the most suitable light intensity in each pixel or each section at a high speed. For example, it is suitable to use the solid state imaging device as a CMOS image sensor, a CCD image sensor or the like.

Embodiments and examples are described in detail above, and the present disclosure is not limited to the above-mentioned embodiments and examples.

For example, numerical values, structures, configurations, shapes, materials and the like exemplified in the above-mentioned embodiments or examples are merely examples and different numerical values, structures, configurations, shapes, materials and the like may be used, as necessary.

The present technology can employ the following configurations.

(1) An optical modulator having a junction formed by at least one layer of graphene which forms an electrode and a transmittance modulation layer and a dielectric layer, wherein an amount of charge accumulated in the graphene is controlled by applying voltage to the junction to control transmitted light intensity.

(2) The optical modulator according to (1), wherein at least one layer of the graphene which forms the electrode and the transmittance modulation layer is provided on one surface or both surfaces of the dielectric layer.

(3) The optical modulator according to (1) or (2), wherein at least one layer of the graphene which forms the electrode and the transmittance modulation layer is one layer of graphene or laminated graphene in which a plurality of layers of graphene are laminated.

(4) The optical modulator according to any one of (1) to (3), wherein chemical doping is performed on at least one layer of the graphene which forms the electrode and the transmittance modulation layer.

(5) The optical modulator according to any one of (1) to (4), wherein n-type dopants or p-type dopants are doped to at least one layer of the graphene which forms the electrode and the transmittance modulation layer.

(6) The optical modulator according to any one of (1) to (5), wherein a dielectric substance which forms the dielectric layer is at least one kind of dielectric substance selected from a group consisting of an inorganic dielectric substance, an organic dielectric substance, a liquid crystal and an ion liquid.

(7) The optical modulator according to any one of (1) to (6), wherein the relative permittivity of the dielectric substance which forms the dielectric layer is equal to or more than 2.0.

(8) The optical modulator according to any one of (1) to (7), wherein the amount of charge accumulated in at least one layer of the graphene which forms the electrode and the transmittance modulation layer is equal to or more than 1 microcoulomb/$cm^2$.

(9) The optical modulator according to any one of (1) to (8), wherein the amount of charge accumulated in at least one layer of the graphene which forms the electrode and the transmittance modulation layer is equal to or more than 33 microcoulombs/$cm^2$.

(10) An optical modulator comprising: a first electrode; a second electrode; and a dielectric layer provided between the first and second electrodes,
wherein at least one of the first electrode and the second electrode comprises at least one layer of graphene.

(11) The optical modulator according to (10), wherein at least one of the first electrode and the second electrode comprises a plurality of graphene layers.

(12) The optical modulator according to (10), wherein each of the first electrode and the second electrode comprises at least one layer of graphene.

(13) The optical modulator according to (10), wherein chemical doping is performed on the at least one layer of graphene to control the Fermi level of the graphene.

(14) The optical modulator according to (10), wherein the dielectric layer comprises a dielectric substance having a relative permittivity of greater than or equal to 2.0.

(15) The optical modulator according to (10), wherein the dielectric layer comprises a ferroelectric substance having spontaneous polarization.

(16) The optical modulator according to (10), wherein at least one of metal nanoparticles and metal nanowires are formed on the at least one layer of graphene.

(17) The optical modulator according to (10), wherein the dielectric layer comprises a substance selected from the group consisting of: $SiO_2$, $Al_2O_3$, hexagonal boron nitride, $HfO_2$, $ZrO_2$, ZnO, $TiO_2$, indium gallium-doped zinc oxide, SiN, GaN, strontium titanate, barium titanate, lead zirconate titanate, lead titanate, lead lanthanum zirconate titanate, $CaF_2$, polyvinylidene fluoride, amorphous fluororesin, an ionic liquid and a liquid crystal.

(18) The optical modulator according to (10), wherein the first electrode and the second electrode are provided on a substrate made of a material transparent to light in a wavelength region that performs optical modulation.

(19) The optical modulator according to (10), wherein the first electrode, the dielectric layer and the second electrode form a junction, and a total thickness of the junction is set such that light having a wavelength that performs optical modulation is reflected inside the junction in a multiple manner.

(20) The optical modulator according to (10), wherein an optical adjustment layer is provided between the dielectric layer and the at least one layer of graphene.

(21) The optical modulator according to (10), wherein a charge of greater than or equal to 1 microcoulomb/cm$^2$ is accumulated on the at least one layer of graphene.

(22) An imaging device comprising: a light receiving unit, wherein the light receiving unit includes an optical modulator for controlling an intensity of light incident to the light receiving unit, the optical modulator comprising: a first electrode; a second electrode; and a dielectric layer provided between the first and second electrodes, and wherein at least one of the first electrode and the second electrode comprises at least one layer of graphene.

(23) The device according to (22), wherein the light receiving unit includes a plurality of optical modulators, and wherein each of the plurality of optical modulators is serially connected to another one of the plurality of optical modulators through a shared dielectric layer.

(24) The device according to (22), wherein the light receiving unit includes a plurality of optical modulators, wherein each of the plurality of optical modulators is serially connected to another one of the plurality of optical modulators, and wherein for each of the plurality of optical modulators, at least one of the first electrode and the second electrode is shared with an adjacent one of the plurality of optical modulators.

(25) A display apparatus comprising: a light emitting unit, wherein the light emitting unit includes an optical modulator for controlling an intensity of light emitted from the light emitting unit to perform displaying, the optical modulator comprising: a first electrode; a second electrode; and a dielectric layer provided between the first and second electrodes, and wherein at least one of the first electrode and the second electrode comprises at least one layer of graphene.

(26) The display apparatus according to (25), wherein the light emitting unit includes a plurality of optical modulators, and wherein each of the plurality of optical modulators is serially connected to another one of the plurality of optical modulators through a shared dielectric layer.

(27) The display apparatus according to (25), wherein the light emitting unit includes a plurality of optical modulators, wherein each of the plurality of optical modulators is serially connected to another one of the plurality of optical modulators, and wherein for each of the plurality of optical modulators, at least one of the first electrode and the second electrode is shared with an adjacent one of the plurality of optical modulators.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

11 Dielectric layer
12, 13 Electrode
14 Direct current power supply
G Graphene

The invention claimed is:

1. An optical modulator comprising:
   a first electrode;
   a second electrode;
   a dielectric layer provided between the first and second electrodes; and
   a junction,
   wherein at least one of the first electrode and the second electrode comprises at least one layer of graphene, and a dopant layer is formed on the at least one layer of graphene,
   wherein the junction includes the at least one layer of graphene and the dielectric layer,
   wherein an amount of charge accumulated in the at least one layer of graphene is controlled by applying voltage to the junction to control transmitted light intensity,
   wherein the optical modulator is configured to control an intensity of light which is incident on the first electrode, then is transmitted through the dielectric layer, and then exits through the second electrode, and
   wherein the optical modulator is configured to perform optical modulation in a wavelength region equal to or less than 1 μm by accumulating a charge of greater than or equal to 1 microcoulomb/cm$^2$ on the at least one layer of graphene by voltage application.

2. The optical modulator according to claim 1, wherein at least one of the first electrode and the second electrode comprises a plurality of graphene layers.

3. The optical modulator according to claim 1, wherein each of the first electrode and the second electrode comprises at least one layer of graphene.

4. The optical modulator according to claim 1, wherein the dielectric layer comprises a dielectric substance having a relative permittivity of greater than or equal to 2.0.

5. The optical modulator according to claim 1, wherein the dielectric layer comprises a ferroelectric substance having spontaneous polarization.

6. The optical modulator according to claim 1, wherein at least one of metal nanoparticles and metal nanowires are provided on the at least one layer of graphene.

7. The optical modulator according to claim 1, wherein the dielectric layer comprises a substance selected from the group consisting of: $SiO_2$, $Al_2O_3$, hexagonal boron nitride, $HfO_2$, $ZrO_2$, ZnO, $TiO_2$, indium gallium-doped zinc oxide, SiN, GaN, strontium titanate, barium titanate, lead zirconate titanate, lead titanate, lead lanthanum zirconate titanate, $CaF_2$, polyvinylidene fluoride, amorphous fluororesin, an ionic liquid and a liquid crystal.

8. The optical modulator according to claim 1, wherein the first electrode and the second electrode are provided on a substrate made of a material transparent to light in a wavelength region that performs optical modulation.

9. The optical modulator according to claim 1, wherein the junction includes the first electrode, the dielectric layer and the second electrode, and a total thickness of the junction is set such that light having a wavelength that performs optical modulation is reflected inside the junction in a multiple manner.

10. The optical modulator according to claim 1, wherein an optical adjustment layer is provided between the dielectric layer and the at least one layer of graphene.

11. The optical modulator according to claim 1, wherein the dielectric layer comprises a dielectric substance that is transparent to light in a wavelength region which performs optical modulation.

12. An imaging device comprising: a light receiving unit,
wherein the light receiving unit includes an optical modulator for controlling an intensity of light incident to the light receiving unit, the optical modulator comprising:
a first electrode;
a second electrode;
a dielectric layer provided between the first and second electrodes; and
a junction,
wherein at least one of the first electrode and the second electrode comprises at least one layer of graphene, and a dopant layer is formed on the at least one layer of graphene,
wherein the junction includes the at least one layer of graphene and the dielectric layer,
wherein an amount of charge accumulated in the at least one layer of graphene is controlled by applying voltage to the junction to control transmitted light intensity,
wherein the optical modulator is configured to control an intensity of light which is incident on the first electrode, then is transmitted through the dielectric layer, and then exits through the second electrode, and
wherein the optical modulator is configured to perform optical modulation in a wavelength region equal to or less than 1 µm by accumulating a charge of greater than or equal to 1 microcoulomb/cm$^2$ on the at least one layer of graphene by voltage application.

13. The device according to claim 12, wherein the light receiving unit includes a plurality of optical modulators, and wherein each of the plurality of optical modulators is serially connected to another one of the plurality of optical modulators through a shared dielectric layer.

14. The device according to claim 12, wherein the light receiving unit includes a plurality of optical modulators, wherein each of the plurality of optical modulators is serially connected to another one of the plurality of optical modulators, and wherein for each of the plurality of optical modulators, at least one of the first electrode and the second electrode is shared with an adjacent one of the plurality of optical modulators.

15. A display apparatus comprising: a light emitting unit,
wherein the light emitting unit includes an optical modulator for controlling an intensity of light emitted from the light emitting unit to perform displaying, the optical modulator comprising:
a first electrode;
a second electrode;
a dielectric layer provided between the first and second electrodes; and
a junction,
wherein at least one of the first electrode and the second electrode comprises at least one layer of graphene, and a dopant layer is formed on the at least one layer of graphene,
wherein the junction includes the at least one layer of graphene and the dielectric layer,
wherein an amount of charge accumulated in the at least one layer of graphene is controlled by applying voltage to the junction to control transmitted light intensity,
wherein the optical modulator is configured to control an intensity of light which is incident on the first electrode, then is transmitted through the dielectric layer, and then exits through the second electrode, and
wherein the optical modulator is configured to perform optical modulation in a wavelength region equal to or less than 1 µm by accumulating a charge of greater than or equal to 1 microcoulomb/cm$^2$ on the at least one layer of graphene by voltage application.

16. The display apparatus according to claim 15, wherein the light emitting unit includes a plurality of optical modulators, and wherein each of the plurality of optical modulators is serially connected to another one of the plurality of optical modulators through a shared dielectric layer.

17. The display apparatus according to claim 15, wherein the light emitting unit includes a plurality of optical modulators, wherein each of the plurality of optical modulators is serially connected to another one of the plurality of optical modulators, and wherein for each of the plurality of optical modulators, at least one of the first electrode and the second electrode is shared with an adjacent one of the plurality of optical modulators.

* * * * *